US009197494B2

(12) United States Patent
Yamato et al.

(10) Patent No.: US 9,197,494 B2
(45) Date of Patent: Nov. 24, 2015

(54) COMMUNICATION SYSTEM, CONTROL DEVICE, NODE, PROCESSING RULE SETTING METHOD AND PROGRAM

(75) Inventors: Junichi Yamato, Tokyo (JP); Takayuki Hama, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 13/824,785

(22) PCT Filed: Sep. 7, 2011

(86) PCT No.: PCT/JP2011/005012
§ 371 (c)(1),
(2), (4) Date: Apr. 1, 2013

(87) PCT Pub. No.: WO2012/049807
PCT Pub. Date: Apr. 19, 2012

(65) Prior Publication Data
US 2013/0201821 A1    Aug. 8, 2013

(30) Foreign Application Priority Data
Oct. 15, 2010   (JP) ................................. 2010-232792

(51) Int. Cl.
*H04L 12/24*     (2006.01)
*H04L 12/721*    (2013.01)

(52) U.S. Cl.
CPC ........ *H04L 41/0672* (2013.01); *H04L 41/0863* (2013.01); *H04L 41/0893* (2013.01); *H04L 45/38* (2013.01); *H04L 41/0654* (2013.01)

(58) Field of Classification Search
USPC ......... 370/216, 225, 229, 231, 235, 219, 242, 370/351, 389, 392
See application file for complete search history.

(56) References Cited

U.S. PATENT DOCUMENTS

| 2003/0185226 | A1* | 10/2003 | Tang et al. ................... 370/428 |
| 2007/0076606 | A1* | 4/2007 | Olesinski et al. ............. 370/230 |
| 2008/0189769 | A1* | 8/2008 | Casado et al. .................... 726/4 |
| 2008/0222275 | A1 | 9/2008 | Yumoto |
| 2011/0173490 | A1* | 7/2011 | Narayanaswamy et al. . 714/4.11 |

FOREIGN PATENT DOCUMENTS

CN           1961536 A     5/2007

OTHER PUBLICATIONS

International Search Report in PCT/JP2011/005012 dated Oct. 4, 2011.

(Continued)

*Primary Examiner* — Edan Orgad
*Assistant Examiner* — Saumit Shah
(74) *Attorney, Agent, or Firm* — McGinn IP Law Group, PLLC

(57) ABSTRACT

A communication system includes a plurality of nodes and a control device. Each node includes a packet processor that processes a packet in accordance with a processing rule when the packet is received. The processing rule correlates the processing applied to the packet with a matching rule that identifies the packet the processing is to be applied to. The control device calculates a packet forwarding path in response to a request for setting processing rules from any node, sets processing rules that implement the packet forwarding path on the node on the packet forwarding path and records the processing rules in a manner coordinated with one another. The control device inquires at the node on the packet forwarding path about state of setting of processing rule and, upon detecting failure in the processing rule set in at least one node, executes rollback operation on the correlated processing rules set in other node.

17 Claims, 38 Drawing Sheets

(56) References Cited

OTHER PUBLICATIONS

A. Doria, et al. "RFC5810—Forwarding and Control Element Separation (ForCES) Protocol Separation" [retrieved on Sep. 21, 2010] Internet <URL: http://www.faqs.org/rfcs5810.html>.

"OpenFlow Switch Specification" Version 1.1.0. (Wire Protocol 0x01) [retrieved on Sep. 21, 2010] Dec. 31, 2009 Internet <URL: http://www.openflowswitch.org/documents/openflow-spec-v1.0.0.pdf>.

Nick McKeown et al, "OpenFlow: Enabling Innovation in Campus Networks", [retrieved on Sep. 21, 2010] Mar. 14, 2008, Internet <URL: http://www.openflowswitch.org//documents/openflow-wp-latest.pdf>.

Masashi Hayashi, et al. "Flow Entry Control using Transaction Management", Proceedings of the 2010 IEICE General Conference, Mar. 2, 2010.

Chinese Office Action dated Jul. 29, 2015 with an English translation thereof.

* cited by examiner

FIG. 38

| Wildcards | In Port | Ether SA | Ether DA | Ether type | VLAN ID | VLAN PCP | IP SA | IP DA | IP proto | IP ToS bits | TCP/UDP src port | TCP/UDP dst port | Actions | Stats |

Matching Rule (In Port through TCP/UDP dst port)

COMMUNICATION SYSTEM, CONTROL DEVICE, NODE, PROCESSING RULE SETTING METHOD AND PROGRAM

CROSS-REFERENCE TO RELATED APPLICATIONS

The present Application claims priority rights based upon JP Patent Application No. 2010-232792 filed in Japan on Oct. 5, 2010. The total of the contents disclosed in the Application of the senior filing date is to be incorporated by reference into the present Application. This disclosure relates to a communication system, a control device, a node, a processing rule setting method and a program. More particularly, it relates to a communication system that implements communication by forwarding a packet(s) using a node(s) arranged in a network. It also relates to a node, a control device, a communication method and to a program.

BACKGROUND ART

Technical Field

Recently, a technique termed Open-Flow has been proposed (see Non Patent Literatures 1 and 2). The OpenFlow comprehends communication as an end-to-end flow and exercises path control, recovery from malfunctions, load distribution and optimization on the flow-by-flow basis. The Open-Flow switch, operating as a forwarding node, includes a secure channel for communication with an OpenFlow controller. The OpenFlow switch is operated in accordance with a flow table, addition in or rewriting of which is commanded from time to time by the OpenFlow controller. In a flow table, a set of a matching rule (header field) for matching to a packet header, an action defining the contents of processing and the flow statistics information (Stats), is defined on the flow-by-flow basis (see FIG. 38).

FIG. 38 shows names and contents of actions, as an example, as defined in the Non Patent Literature 2. OUTPUT is an action that outputs a packet at a specified port (interface). SET_VLAN_VID to SET_TP_DST are actions that correct the field of a packet header.

For instance, upon receiving a first packet, the OpenFlow switch retrieves the flow table in search for an entry having a matching rule that matches to the packet's header information (FlowKey). If, as a result of the retrieval, the entry that matches to the incoming packet has been found, the Open-Flow switch applies to the incoming packet the contents of processing stated in an entry's action field. If, as a result of the above mentioned retrieval, no entry that matches to the incoming packet has been found, the OpenFlow switch forwards the incoming packet to the OpenFlow controller, over the secure channel, with a request to the controller to decide a path for the incoming packet based upon its source as well as destination. The OpenFlow switch then receives the implementing flow entry to update the flow table.

Non Patent Literature 3 shows a design statement of a protocol for separating a forwarding element and a control element (ForCES). In 4.3.1.2.2, Transaction Protocol of the Non Patent Literature 3, it is stated that two-phase commit control is to be used for transactional management of a plurality of messages within one forwarding element or across a plurality of forwarding elements.

CITATION LIST

Non Patent Literature

[Non-Patent Literature 1]
Nick McKeown et al., "OpenFlow: Enabling Innovation in Campus Networks", [online], [retrieved on Sep. 21, 2010], Internet
[Non-Patent Literature 2]
"OpenFlow Switch Specification" Version 1.0.0. (Wire Protocol 0x01) [retrieved on Sep. 21, 2010], Internet
[Non-Patent Literature 3]
"RFC5810—Forwarding and Control Element Separation (ForCES) Protocol Separation", [retrieved on Sep. 21, 2010], Internet

SUMMARY

Technical Problem

It is now supposed that an OpenFlow controller, requested to decide the above mentioned forwarding path for the received packet, is to forward the received packet and succeeding packets belonging to the same flow. The OpenFlow controller, inclusive of the OpenFlow controllers of the Non Patent Literatures 2 and 3, are referred to below as the 'control device'. In this case, it is necessary to set integrated flow entries in the total of the OpenFlow switches that are present on the forwarding path. The OpenFlow switches, inclusive of the OpenFlow controllers of the Non Patent Literatures 2 and 3, are referred to below as 'nodes', and the flow entries, inclusive of the flow entries stored in the flow tables of the OpenFlow switches of the Non Patent Literatures 2 and 3, are referred to below as 'processing rules' or 'packet handling operations'. It is noted that, in case proper processing rules failed to be set in a part of the nodes on the forwarding path, it is likely that not only packets are dropped, but also an occurrence may happen where the packets are forwarded in a loop fashion. It is thus necessary to detect such failure to take prompt measures.

It may also be feared that, after setting the processing rules, part of the processing rules is erased due to node failures. In such case, there is a possibility that integrity of the flow entry is lost.

However, with the OpenFlow design specification of Non Patent Literature 2, even if there is a node(s) where the above mentioned proper processing rule failed to be set, such node requests the control device to set the processing rule(s) again when the node has received a succeeding packet, thereby restoring the integrity. Viz., the OpenFlow design specification of Non Patent Literature 2 lacks in a scheme where the lack in integrity of the processing rules is promptly detected to take proper measures.

In view of the above depicted status of the art, the present disclosure has been achieved. It is an object of the present disclosure to provide a communication system in which it is possible to set and hold integrated processing rules in a node or nodes. It is also intended by the present disclosure to provide a control device, a node, a processing rule setting method and a program.

In a first aspect of the present disclosure, a communication system includes a plurality of nodes, and a control device. Each of the nodes includes a packet processor that processes a packet in accordance with a processing rule(s) when the packet is received. The processing rule(s) correlates the processing to be applied to the packet with a matching rule that identifies the packet to which the processing is to be applied.

The control device calculates a packet forwarding path in response to a request to set the processing rule(s) from any (arbitrary) one of nodes. The control device sets a plurality of the processing rules that implement the packet forwarding path for the node(s) present on the packet forwarding path, and records the processing rules in correlation with one another. The control device inquires at the node(s) present on the packet forwarding path about setting states of the processing rule(s). In case a failure is detected in the processing rule(s) set in at least one of the nodes on the packet forwarding path, the control device carries out a rollback operation of the correlated processing rule(s) set in other node(s) on the packet forwarding path.

In a second aspect of the present disclosure, a control device is connected to a plurality of nodes each having a packet processor that processes a packet in accordance with a processing rule(s) when the packet is received. The processing rule(s) correlates the processing to be applied to the packet with a matching rule that identifies the packet to which the processing is to be applied. The control device calculates a packet forwarding path in response to a request for setting a processing rule(s) from any one of nodes, while setting the processing rules that implement the packet forwarding path and recording the processing rules in a state correlated with one another. The control device inquires at the node(s) on the packet forwarding path about the processing rule setting states. When a failure is detected in the processing rule(s) set in at least one of the nodes, the control device performs a rollback operation of the correlated processing rules set in other node(s).

In a third aspect of the present disclosure, a node comprises a packet processor that processes a packet in accordance with a processing rule(s) when the packet is received. The processing rule(s) correlates the processing to be applied to the packet with a matching rule that identifies the packet to which the processing is to be applied. In response to an inquiry from any one of the control device(s) according to the second aspect aforementioned, the node returns a flow identifier accorded to the processing rule(s) and a transaction identifier accorded common to the processing rule(s) and the processing rule(s) correlated with the processing rule(s).

In a fourth aspect of the present disclosure, a method for setting a processing rule(s) includes a step in which a control device, connected to a plurality of nodes, calculates a packet forwarding path in response to a processing rule(s) setting request from the node(s). Each node has a packet processor that processes a packet, when the packet is received, in accordance with a processing rule(s) correlating a processing to be applied to the packet with a matching rule that identifies the packet the processing is to be applied to. In the above step, the control device sets a plurality of processing rules that implement the packet forwarding path for the nodes present on the packet forwarding path, while recording the processing rules as they are correlated with one another. The method also includes a step in which control device inquires at the node(s) on the packet forwarding path about a state of setting of the processing rules, and a step in which the control device carries out, in case a failure is detected in the processing rule(s) set in at least one node, a rollback operation for the correlated processing rule(s) set in other node(s). The present method is bound up with specified mechanisms, viz., nodes and the control device controlling these nodes.

In a fifth aspect of the present disclosure, a program may be run on a computer composing the above mentioned control device or node(s). The program may be recorded on a computer-readable recording medium which may be non-transient. Viz., the present invention may be implemented as a computer program product.

The meritorious effects of the present invention are summarized as follows.

According to the present invention, integrated processing rules may be set and maintained in the node(s).

BRIEF DESCRIPTION OF DRAWINGS

FIG. 38 is a diagrammatic view for illustrating a configuration of a flow entry disclosed in Non Patent Literature 2.

PREFERRED MODES

Figure 1:
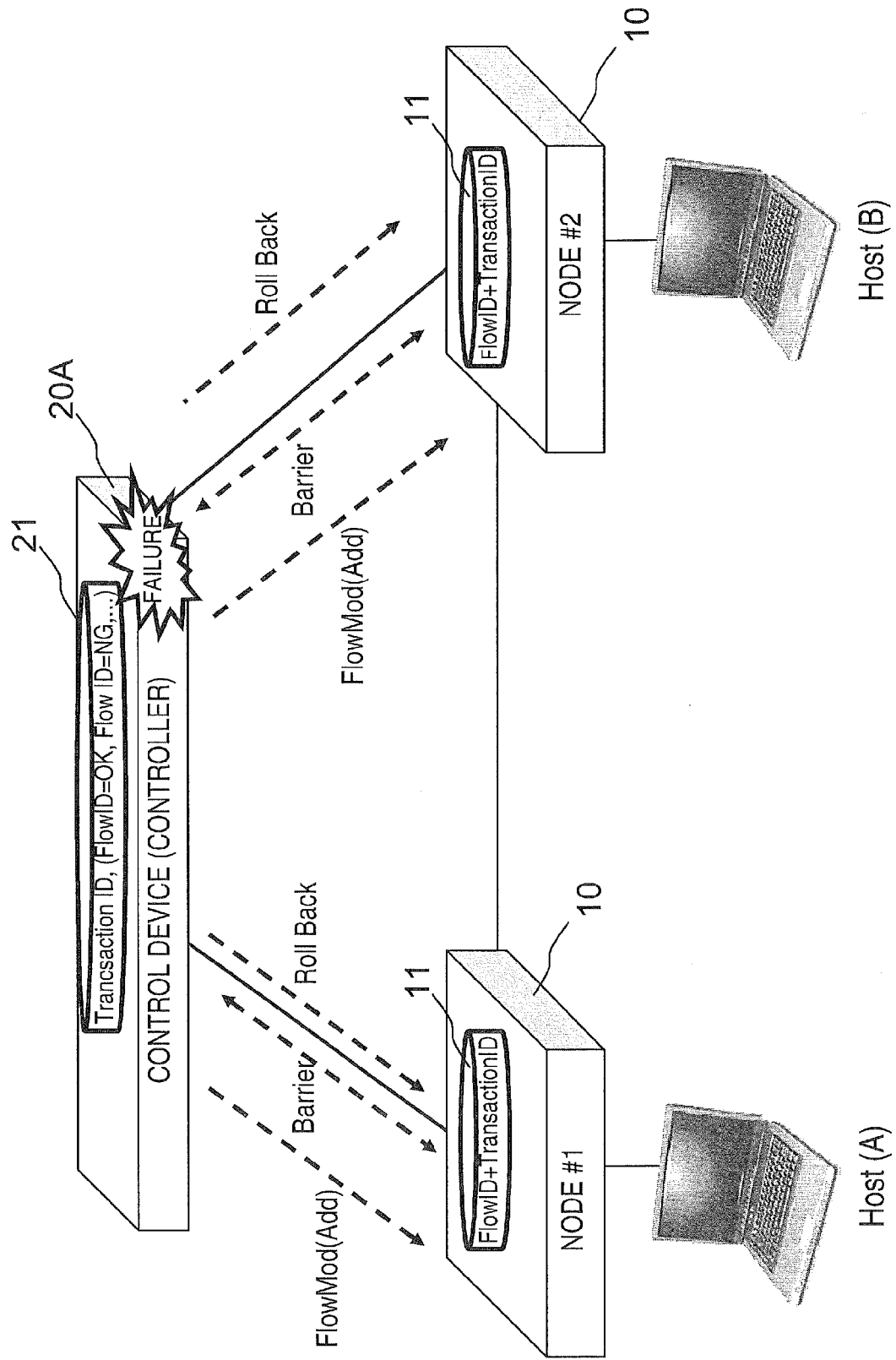
FIG. 1 is a schematic view which shows schemata of the present disclosure.

Initially, the gist and outline of an exemplary embodiment of the exemplary embodiment of present invention will be explained. Referring to FIG. 1, the present disclosure may be implemented by a plurality of nodes 10 and a control device 20. Each of the nodes includes a packet processor that processes a packet in accordance with a processing rule(s) when the packet is received. The processing rule(s) correlate(s) a processing applied to the packet with a matching rule that identifies the packet the processing is to be applied to. The control device calculates a packet forwarding path in response to a request for setting the processing rule(s) from any arbitrary node. The control device sets a plurality of the processing rules that implement the packet forwarding path for the nodes present on the packet forwarding path and records the processing rules in correlation with one another (see the processing rule setting log 21). The control device inquires at the node(s) on the packet forwarding path about the setting states of the processing rules. In case a failure is detected in the processing rule set in at least one of the nodes on the packet forwarding path, the control device carries out a rollback operation of the correlated processing rules set in other node(s) on the packet forwarding path. It is noted that the reference numerals for relevant elements used in the drawings are only for facility in understanding and are not intended to restrict the invention to the mode shown in the drawings.

It is assumed that the control device 20 has calculated a packet forwarding path via two nodes #1 and #2 of FIG. 1 as a communication path between hosts (terminals) (A) and (B) of FIG. 1. In this case, the control device 20 sets in the node #1a processing rule to output a packet received from the host (A) at a port the node #2 is connected to, while setting in the node #2 a processing rule to output the packet received from the node #1 at a port the host (B) is connected to (FlowMod (Add)). The control device 20 also records a setting hysteresis (log) of each of the so set processing rules.

After setting the above mentioned processing rules, the control device 20 inquires at the nodes #1 and #2 about the setting state of the above mentioned processing rules. In an inquiring method, a Barrier message (Request/Reply) or a statistics information request message (Stats Request/Reply), disclosed in Non Patent Literature 2, may be used.

If, as a result of the above inquiry, there is noticed a failure in the processing rule as set in a node, for example, node #2 of FIG. 1, the control device 20 references the processing rule setting log 21 to carry out a rollback operation for the processing rules set in other node(s) (Rollback). More specifically, the control device 20 deletes or updates (returns to a former state) the processing rule at the node #1 belonging to the same flow (viz., having the same transaction ID) as the processing rule whose setting ended up with failure in the node #2 of FIG. 1.

For example, if, in case the packet sent from the host (A) is forwarded via the node #1 to the node #2, no processing rule having the matching rule matched to the packet has been set, a request is made to the control device for setting the processing rule. However, if there is a matching rule in the node #2 which belongs to another flow but which also matches to the packet in question, the packet is processed in accordance with the processing rule set in the node #2. Viz., the packet in question may be forwarded to another node, not shown, or may have its header re-written.

According to the present disclosure, since the rollback operation is carried out using the setting hysteresis as described above, it is possible to prevent packet processing from being carried out in a non-intended manner.

In the case of FIG. 1, the control device 20 records the as-set hysteresis (history). It is also possible for the control device 20 to get the as-set hysteresis recorded in a different journal server or in a control device of a backup system. In exemplary embodiments to follow, the function of the control device 20 is distributed into a plurality of clusters. Moreover, the control device of each cluster is replicated to form a plurality of redundant control devices, viz., multiple of redundant control devices are formed redundantly for each cluster.

Exemplary Embodiment 1

Figure 2:
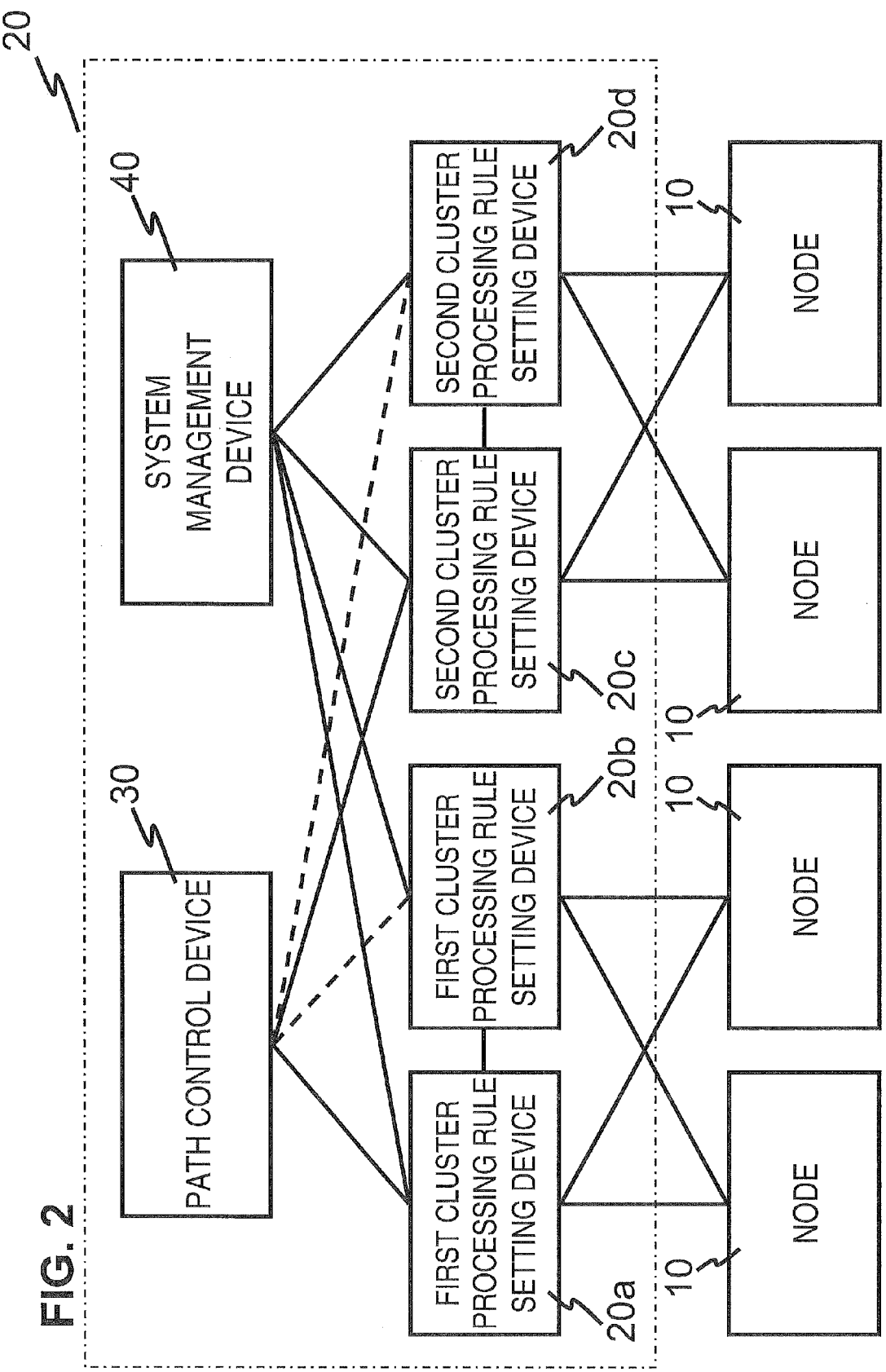
FIG. 2 is a diagrammatic view which shows a configuration of an exemplary embodiment 1 of the present disclosure.

An exemplary embodiment 1 of the present disclosure will now be described with reference to the drawings. FIG. 2 depicts a block diagram showing the configuration of an exemplary embodiment 1 of the present invention. Referring to FIG. 2, there are shown a plurality of nodes 10, processing rule setting devices 20a to 20d, a path control device 30 and a system management device 40. The processing rule setting devices belong to a first cluster or to a second cluster each representing a currently running system and a stand-by system (spare system). The elements surrounded by a chain-dotted line (Reference Signs 20 in FIG. 2) are corresponded to the control device 20A of the abovementioned first exemplary embodiment.

The processing rule setting devices of the first cluster 20a, 20b (the processing rule setting devices of the second cluster 20c, 20d) set processing rules in nodes that are placed under their management. It is assumed that, in the case of FIG. 2, the processing rule setting device of the first cluster 20a is operating in an active state, whereas the processing rule setting device of the first cluster 20b is in a stand-by state. It is also assumed that, in the second cluster, the processing rule setting device of the second cluster 20c is operating in an active state, whereas the processing rule setting device of the second cluster 20d is in a stand-by state.

A path control device 30 calculates a packet forwarding path and prepares corresponding processing rules, based upon requests for preparing the processing rules forwarded from the processing rule setting devices that are in the active states. These are the processing rule setting device of the first cluster 20a and the processing rule setting device of the second cluster 20c among the processing rule setting devices 20a to 20d. The path control device commands the processing rule setting devices in the active states to set the processing rules prepared as described above. The path control device 30 also makes inquiries at the processing rule setting devices in the active states as to whether or not the processing rules have been correctly set. The path control device records the results in a transaction log it holds, while performing rollback as necessary.

The system management device 40 checks the operating states of the processing rule setting devices 20a to 20d and, based upon the so checked results, switches between the currently operating running system and the spare system.

The various devices that make up the above mentioned communication system will now be described in detail with reference to the drawings.

(Node)

Figure 3:
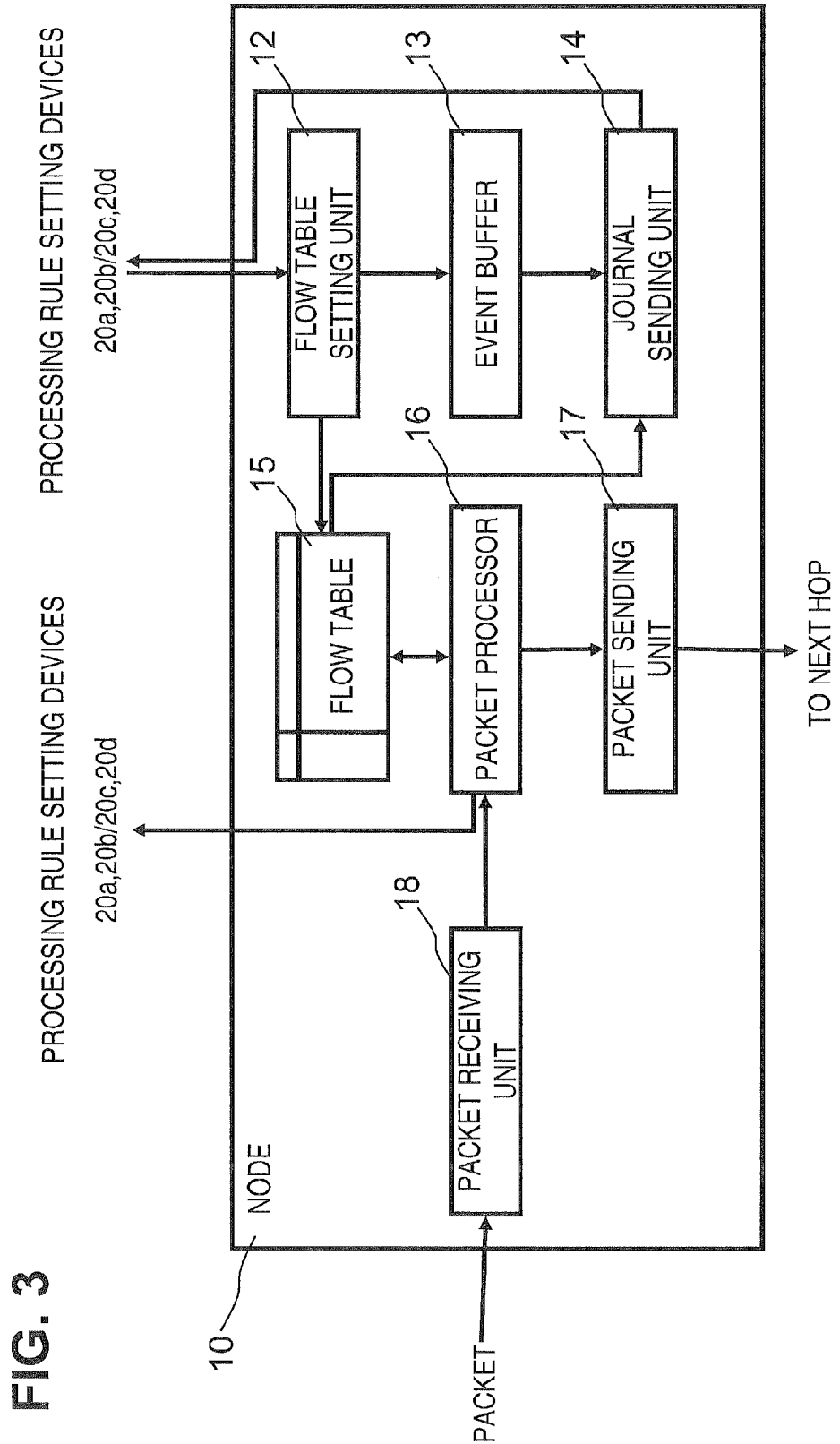
FIG. 3 is a block diagram which shows a configuration of a node of the exemplary embodiment 1.

FIG. 3 depicts a block diagram showing the configuration of a node according to the exemplary embodiment 1 of the present disclosure. Referring to FIG. 3, there is shown a configuration including a flow table setting unit 12, an event buffer 13, a journal transmitting unit 14, a flow table 15, a packet processor 16, a packet transmitting unit 17 and a packet receiving unit 18.

Under instructions from the processing rule setting devices 20a to 20d, the flow table setting unit 12 sets or adds a processing rule to the flow table 15, changes or rewrites the processing rule registered in the flow table, or deletes the so registered processing rule.

Figure 4:
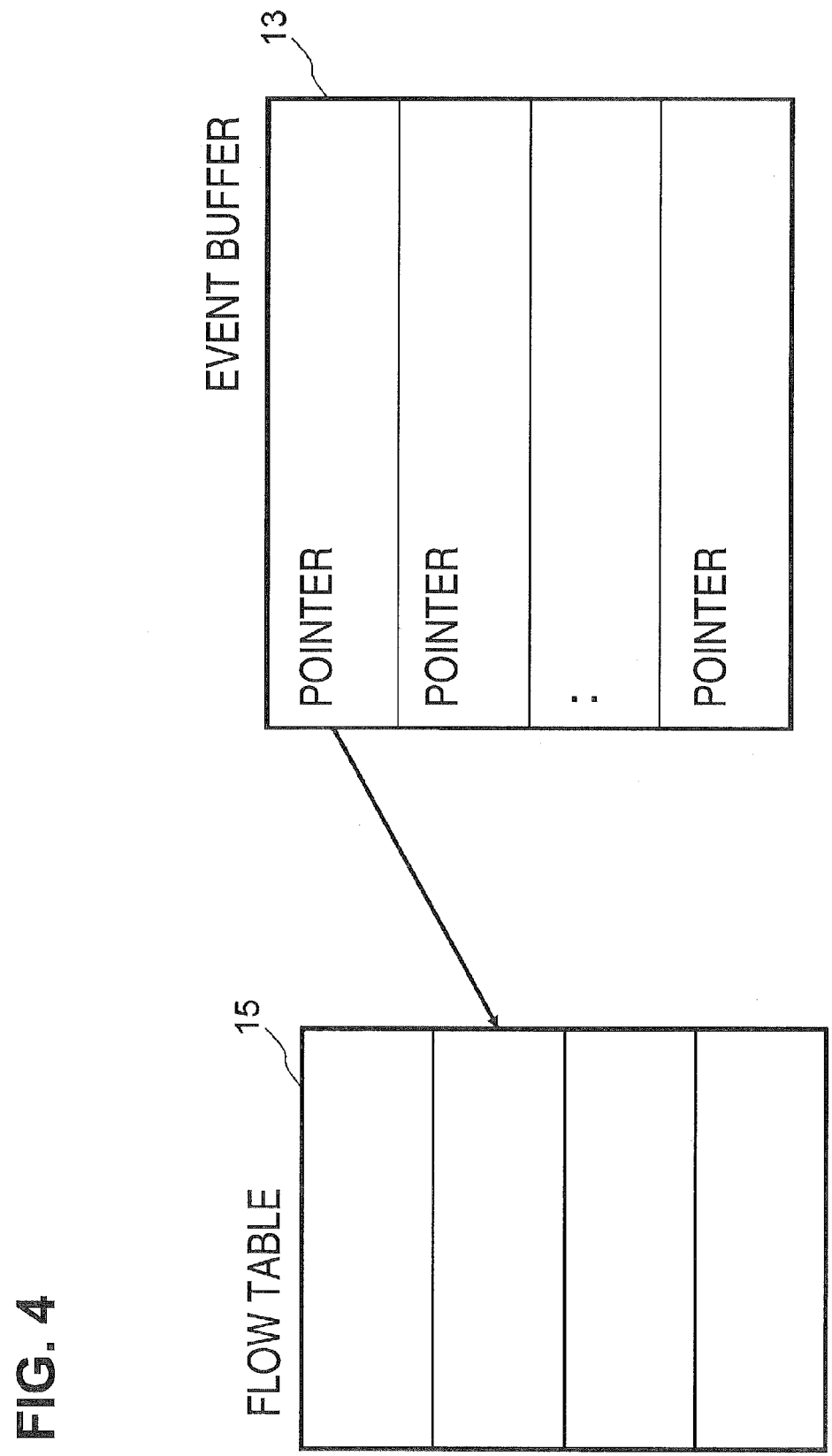
FIG. 4 is a diagrammatic view for illustrating the relationship between a flow table of a node and an event buffer according to the exemplary embodiment 1.

The event buffer 13 is a buffer that stores pointers in accordance with a FIFO (First In First Out) system, as shown in FIG. 4. The pointers indicate the positions of entries in the flow table that were e.g., changed by the flow table setting unit 12. Although the pointers indicating the positions in the flow table are stored in FIG. 4, the contents per se of the flow entries may, for example, be buffered.

In response to inquiries from the processing rule setting devices 20a to 20d about the processing rule setting states, the journal transmitting unit 14 reads out a processing rule at a position indicated by the event buffer 13, and transmits journal data. These journal data include the transaction ID and the flow ID of the processing rule in question. It is noted that, if the above inquiries from the processing rule setting devices 20a to 20d use a Barrier message (Barrier Request), a Barrier message (Barrier Reply) of the Non Patent Literature 2 may be used as a response. By the Barrier message is meant a message that instructs returning, as a response, the processing contents executed by the node in question before the node received the Barrier message (Barrier Request). Stats Request/Reply, making an inquiry into the statistic information regarding the processing rule (Stats), may also be used to check to see whether or not an entry has been correctly set in each node.

Figure 5:
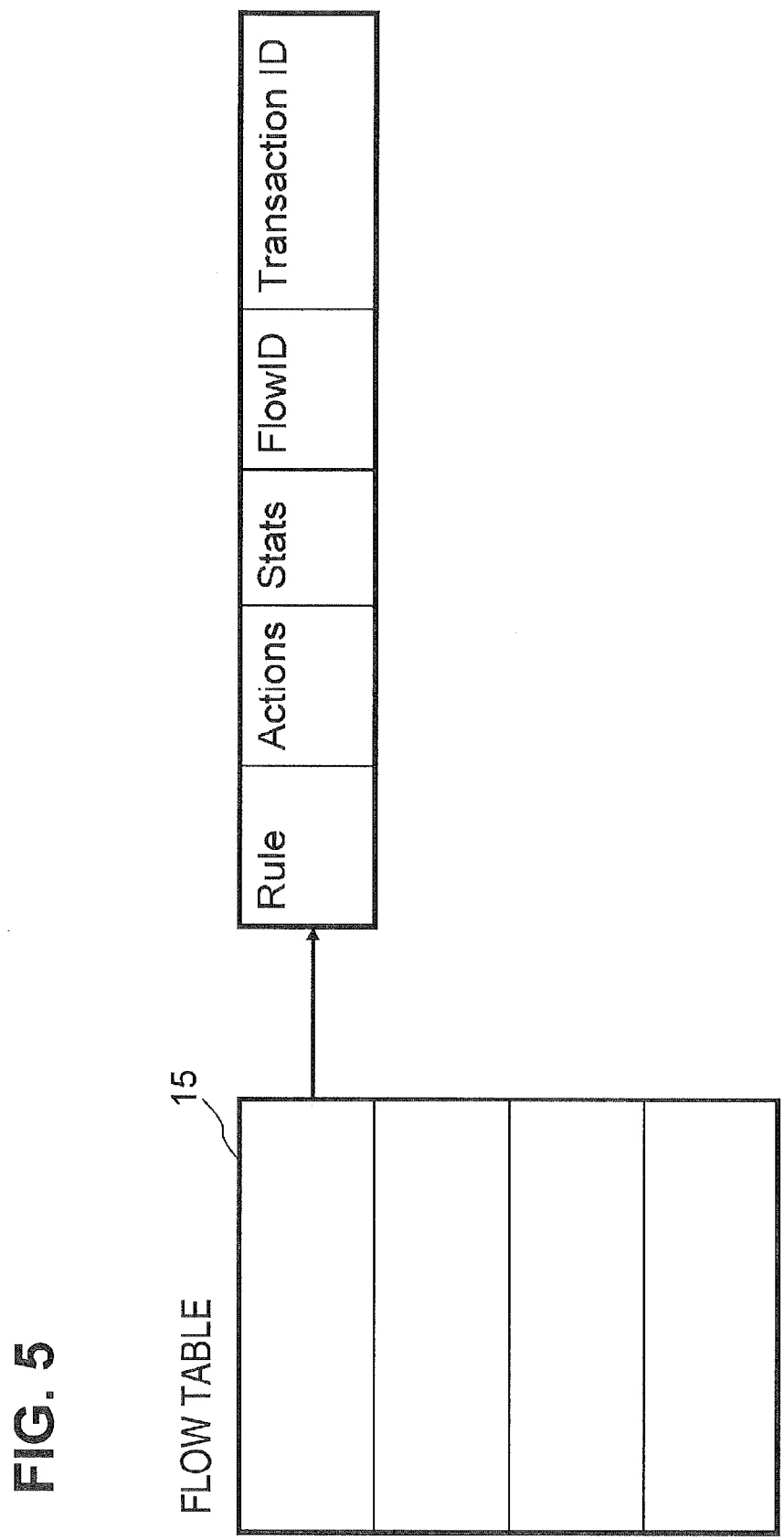
FIG. 5 is a diagrammatic view for illustrating the flow table of the node of the exemplary embodiment 1.

The flow table 15 has, as one entry, a matching rule (Rule), contents of processing (Actions), statistic information (Stats), a flow ID (FlowID) and a transaction ID (Transaction IDs), as shown in FIG. 5. The contents of processing denote the contents of processing performed on a packet that matches to the matching rule. The flow ID, equivalent to the 'flow cookie' of Non Patent Literature 2, is an identifier that uniquely specifies the processing rule in a node in question. The transaction ID, equivalent to the 'xid' of Non Patent Literature 2, is an identifier for the processing rules belonging to the same flow, in which the identifier is set so as to be unique throughout the processing rule setting devices 20a to 20d. The flow table corresponds to the flow entry held by the OpenFlow switch of Non Patent Literature 2, shown in FIG. 38, added to with the flow ID and the transaction ID. By returning the flow entry, including the flow ID and the transaction ID, it is possible to decipher whether or not the processing rules as installed by the processing rule setting devices 20a to 20d on their own have correctly been set or whether or not a sequence of processing rules having the transaction ID in common has correctly been set in its entirety.

The packet processor 16 retrieves the flow table 15 in search for a processing rule having a matching rule matched to the packet received by the packet receiving unit 18 to execute the contents of processing (Actions) stated in the processing rule. In addition, if the matching rule matched to the packet received by the packet receiving unit 18 has not been found in the flow table 15, the packet processor 16 sends the packet (unknown packet) to the processing rule setting devices 20a to 20d to ask them to set the processing rule.

In case the contents of processing stated in the processing rule (Actions) are for packet forwarding (Output), the packet transmitting unit 17 outputs the packet to the next hop via the port specified by the contents of processing (Actions).

The above node 10 may also be implemented by a configuration composed essentially of the OpenFlow switch of Non Patent Literature 2 added by the event buffer 13 and the journal transmitting unit 14.

(Processing Rule Setting Device)

Figure 6:
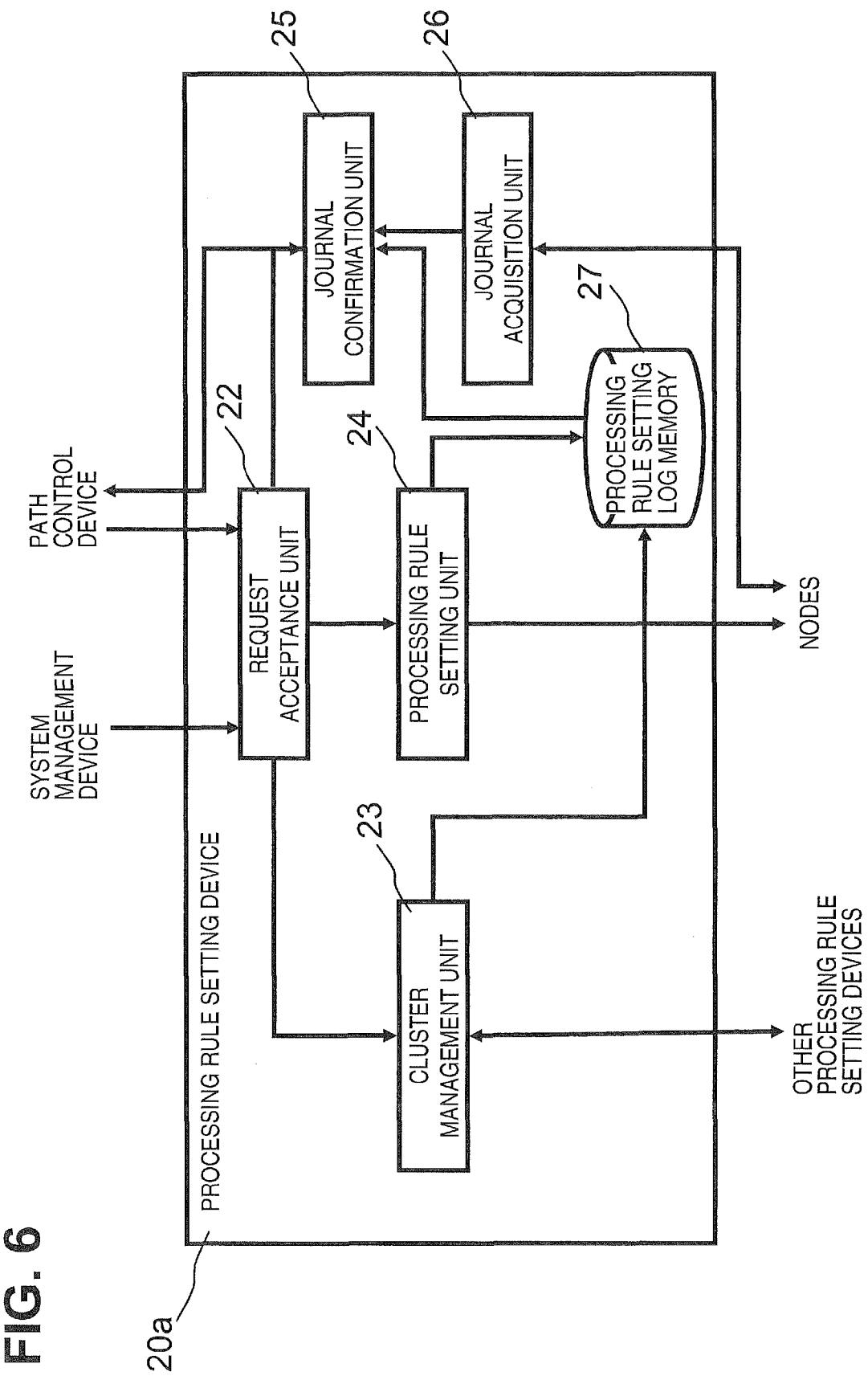
FIG. 6 is a block diagram showing a configuration of a processing rule setting device of the exemplary embodiment 1.

FIG. 6 depicts a block diagram showing the configuration of the processing rule setting device 20a. Referring to FIG. 6, the processing rule setting device 20a includes a request accepting unit 22, a cluster management unit 23, a processing rule setting unit 24, a journal confirmation unit 25, a journal acquisition unit 26 and a processing rule setting log memory 27. The processing rule setting devices 20b to 20d are similar in configuration to one another and hence the explanation for these devices is dispensed with.

The request accepting unit 22 accepts a variety of requests from the path control device 30 or the system management device 40 to forward a packet to other processing units in response to contents of the requests.

The cluster management unit 23 performs communication for status synchronization with the processing rule setting devices belonging to the same cluster. In more concrete terms, if the processing rule setting device 20a is operating in an active system, the cluster management unit 23 sends the processing rule, the cluster management unit requested the processing rule setting unit 24 to set in the node 10, to the processing rule setting device of the standby system, such as the processing rule setting device 20b, for backup recording. On the other hand, if the processing rule setting device 20a is operating in a stand-by system, the cluster management unit 23 performs the processing of recording the processing rule, received from the processing rule setting device of the active system, for example, the processing rule setting device 20b, in the processing rule setting log memory 27 of the setting device of the stand-by system.

The processing rule setting unit 24 forwards a request for setting a processing rule or a rollback command, received from the path control device 30, to the relevant node 10, while registering the contents of the request or the command in the processing rule setting log memory 27.

The journal acquisition unit 26 inquires at the node 10 about the processing rule setting state, and acquires journal data, including the flow ID and the transaction ID, included in turn in the processing rule at a location indicated by a pointer of the event buffer 13 of the node 10.

The journal confirmation unit 25 matches journal data, including the flow ID and the transaction ID, acquired by the journal acquisition unit 26, to the setting hysteresis of the processing rules stored in the processing rule setting log memory 27. The journal confirmation unit thus confirms whether or not the processing rule set by the processing rule setting unit 24 has been correctly set in the node 10. The journal confirmation unit 25 also sends the results of the confirmation to the path control device 30.

In case the processing rule setting device 20a is operating as the active system, the processing rules, as set by the processing rule setting unit 24, are sequentially registered in the processing rule setting log memory 27. In case the processing rule setting device 20a is operating in the stand-by system, the processing rules, received via cluster management unit 23 from the other processing rule setting device 20b, are so registered. Viz., the contents of the processing rule setting log memories 27 of the processing rule setting device of the active system 20a and the processing rule setting device of the stand-by system 20b are maintained synchronized in such a manner that the contents registered in the flow tables 15 of the respective nodes are in an accumulated, summarized state.

Figure 7:
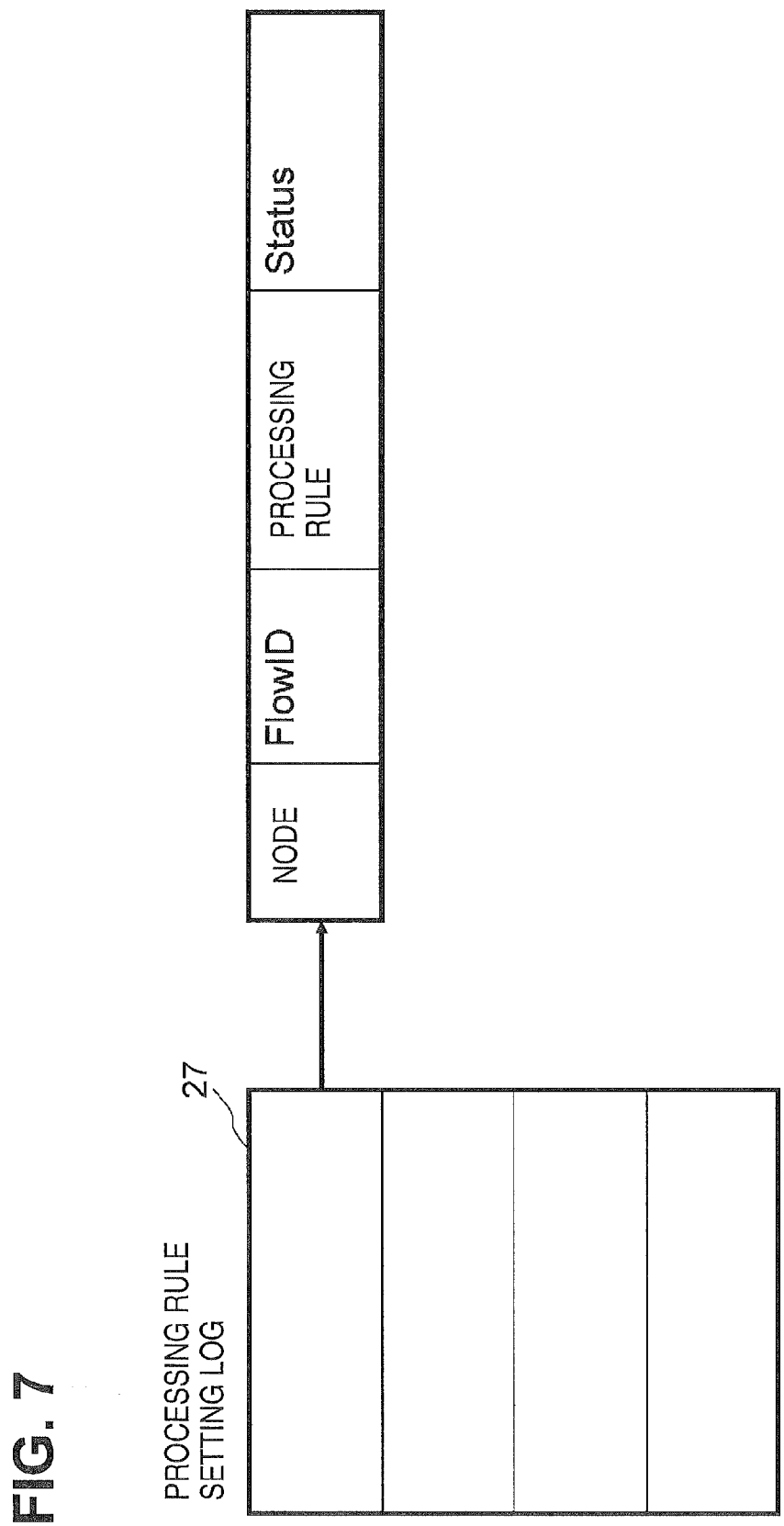
FIG. 7 is a diagrammatic view for illustrating a flow setting log of the processing rule setting device of the exemplary embodiment 1.

FIG. 7 shows an example processing rule setting log recorded in the processing rule setting log memory 27. In the example log of FIG. 7, the node as an object of setting of the processing rule (node ID), the flow ID, the processing rule and a status flag (Status), are stored. The status flag (Status) indicates whether or not rollback has been performed.

(Path Control Device)

Figure 8:
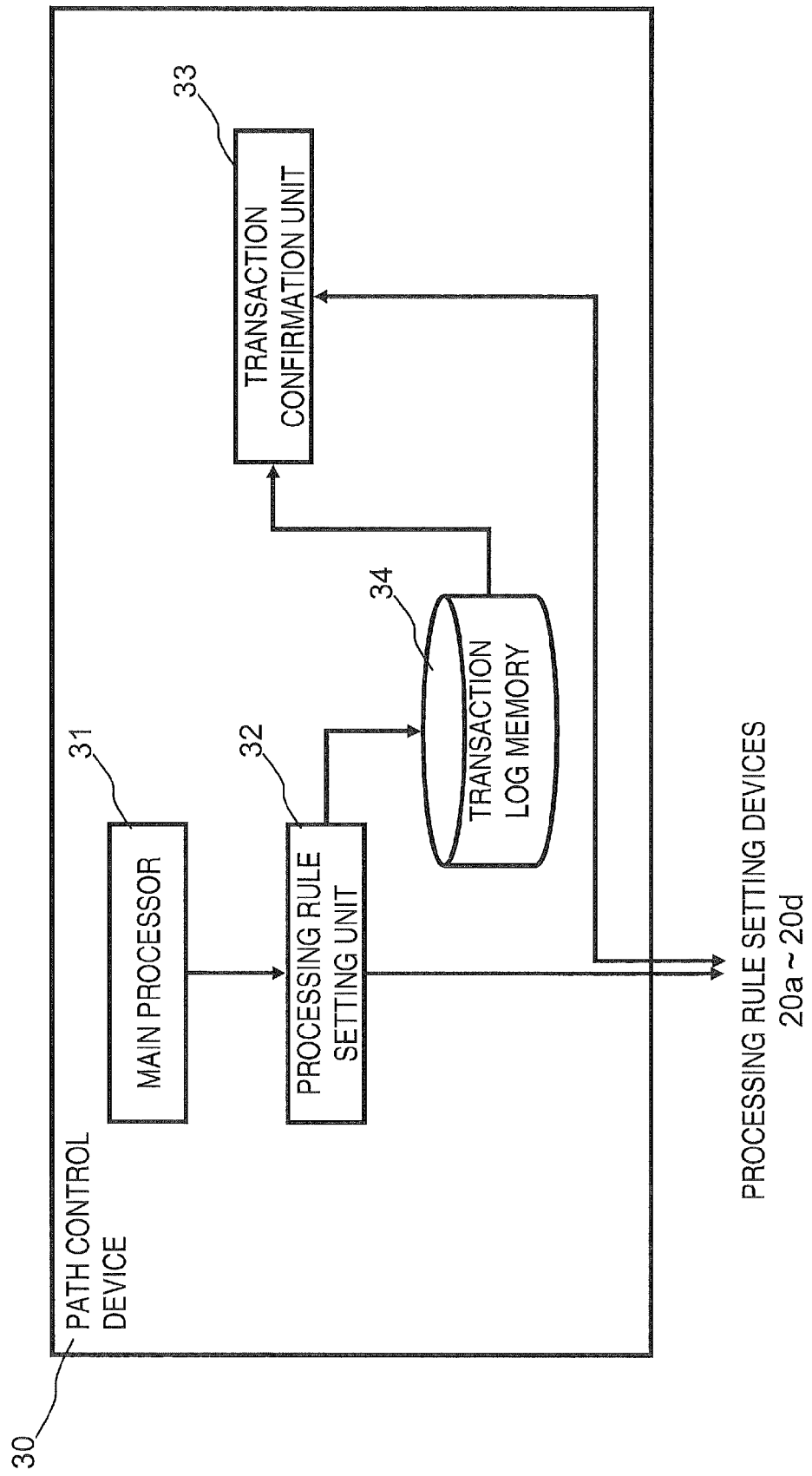
FIG. 8 is a block diagram showing a configuration of a path control device of the exemplary embodiment 1.

FIG. 8 depicts a block diagram showing the configuration of the path control device 30. Referring to FIG. 8, the path control device is made up of a main processor 31, a processing rule setting unit 32, a transaction confirmation unit 33 and a transaction log memory 34.

The main processor 31 references the network topology, and calculates, from a request for setting a processing rule, a packet forwarding path along which to forward the packet received. The main processor also prepares a processing rule to be set in each node on the packet forwarding path.

The processing rule setting unit 32 requests the processing rule setting devices, associated with the nodes on the packet forwarding path, to set the processing rules prepared by the main processor 31.

The transaction confirmation unit 33 updates transaction logs, based upon the results of confirmation from the respective processing rule setting devices indicating whether or not the processing rules as set by the respective processing rule setting devices have been correctly set in the nodes 10. If, as a result of the update, failed setting of the processing rule having a certain transaction ID is noticed, the transaction confirmation unit 33 instructs the processing rule setting device, supervising the node where the processing rule having the transaction ID has been set, to carry out rollback via the main processor 31.

It is noted that a computer program that allows the respective components (processing means) of the processing rule setting devices 20a to 20d and the path control device 30, shown in FIGS. 6 and 8, to execute the above mentioned processing operations may also be used. At this time, the hardware of a computer, composing the above devices, is used. It is also noted that the configurations shown in FIGS. 6 and 8 represent cases of illustrative function distribution of the processing rule setting devices 20a to 20d and the path control device 30. Viz., the respective components (processing means) of the two sorts of the devices may be combined together or the processing means of one of the two sorts of devices may be owned by the other device.

Figure 9:
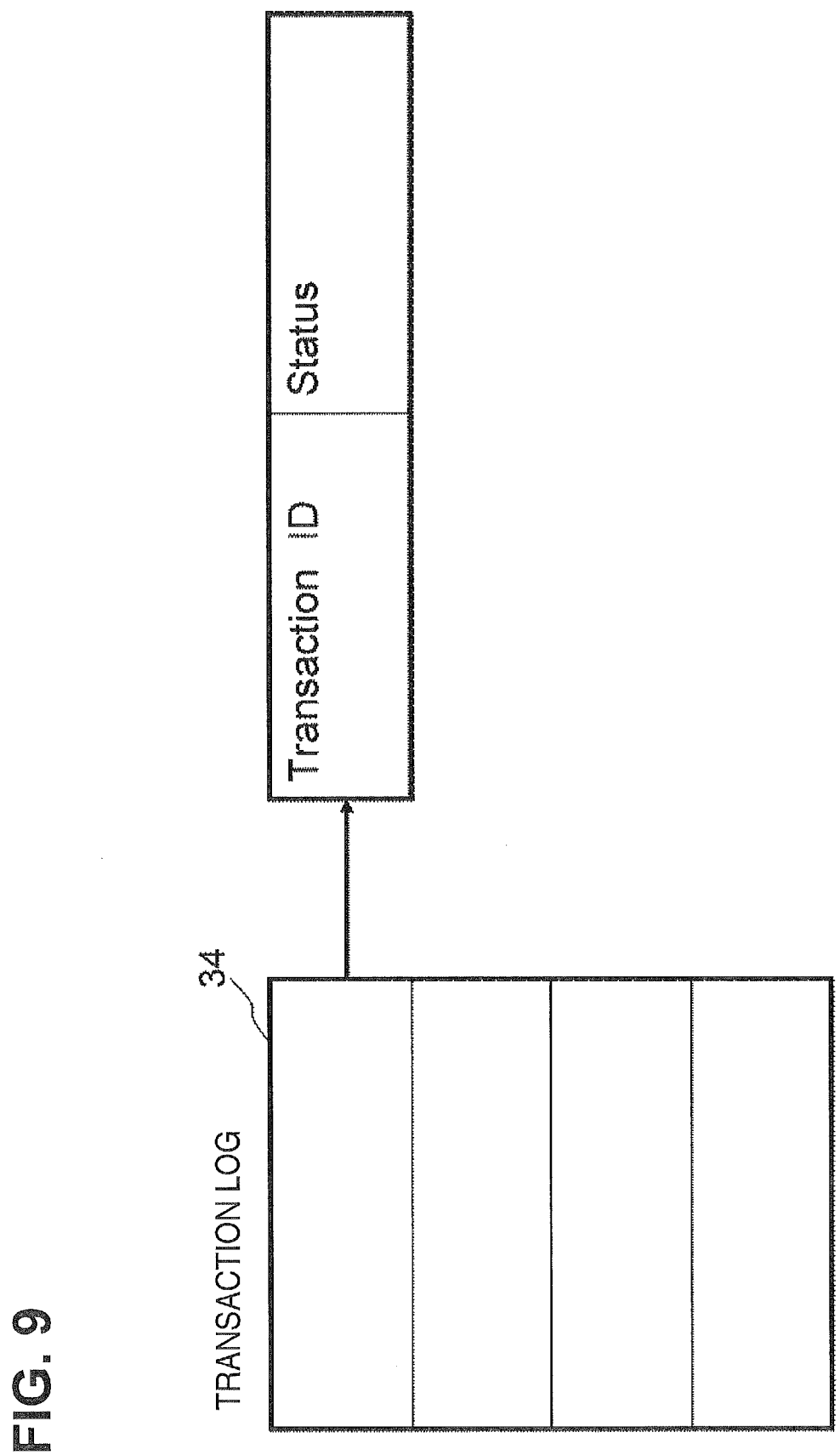
FIG. 9 is a diagrammatic view for illustrating a transaction log of the path control device of the exemplary embodiment 1.

FIG. 9 shows an example configuration of the transaction log. In this case of FIG. 9, transaction IDs and the statuses of the transaction IDs (Status) are recorded. In each field for the status of the transaction ID (Status), the Status information of 'send request' is written if the stage of the transaction is that of requesting the setting of the processing rule. The Status information may then be in the form of success/fail depending upon the result of the setting of the processing rule received from each node.

The operation of the present exemplary embodiment will now be explained in detail with reference to the drawings. FIGS. 10 to 13 illustrate an example operation of the exemplary embodiment 1 of the present disclosure. In the explanation to follow, it is assumed that a packet addressed from a certain host (terminal) to another has been entered to the path control device 30, a proper forwarding path has been calculated by the path control device 30, and that preparation of the processing rules that implement this packet forwarding path has completed.

Figure 10:
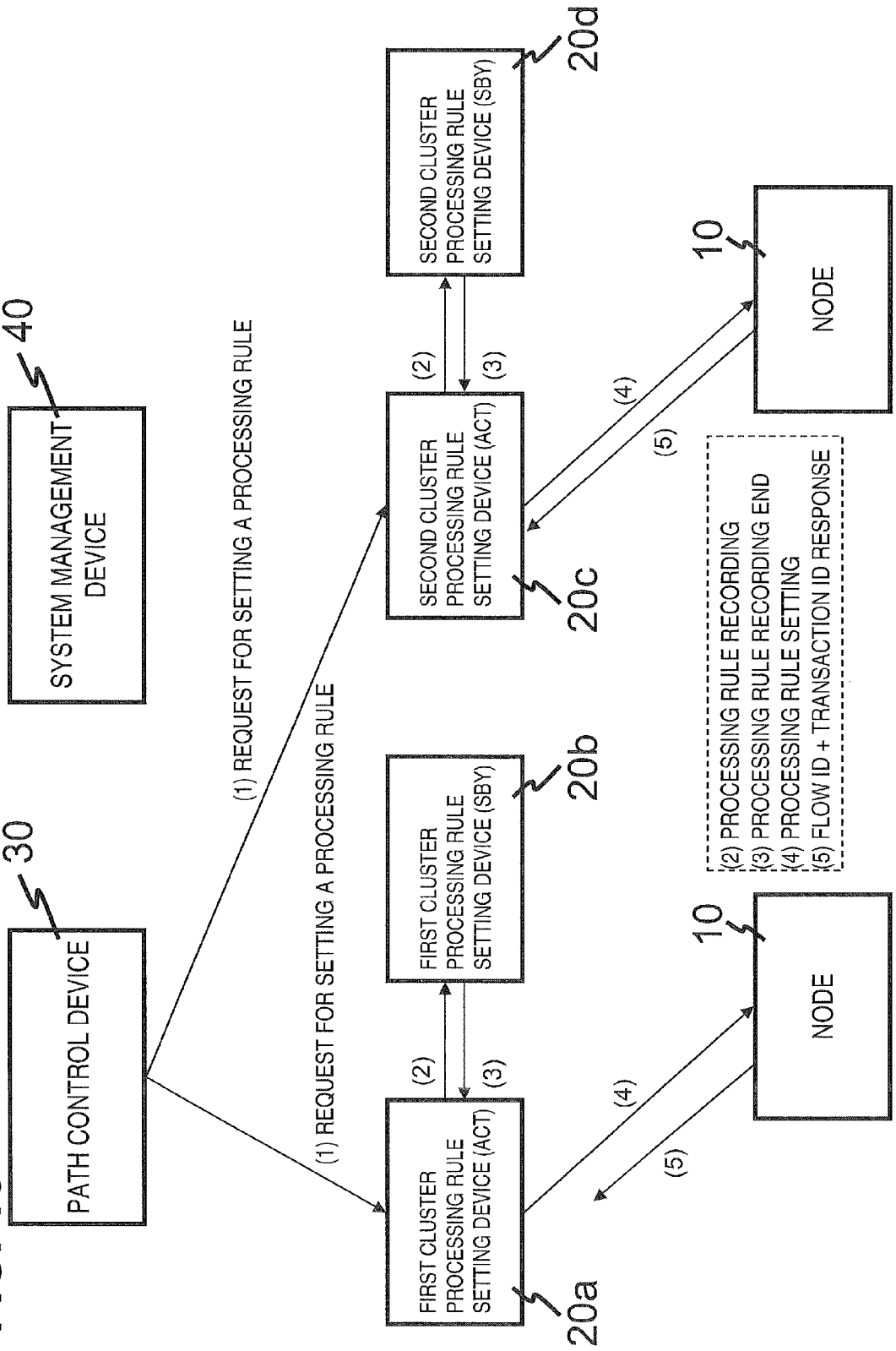
FIG. 10 is a schematic view for illustrating an example operation of the exemplary embodiment 1.

Referring first to FIG. 10, the path control device 30 requests the processing rule setting devices 20a and 20c, operating in the active state, to set processing rules ((1) of FIG. 10).

On receiving the request for setting a processing rule, the processing rule setting devices 20a and 20c, operating in the active state, request the processing rule setting devices 20b and 20d, waiting in the stand-by state, to record the processing rules ((2) of FIG. 10).

On receiving a notification of the end (completion) of recording of the processing rules ((3) of FIG. 10) from the processing rule setting devices 20b and 20d, waiting in the standby system, the processing rule setting devices 20a and 20c set the processing rules in the nodes specified ((4) of FIG. 10). It is here assumed that the new processing rule has been added and registered in the flow table 15 of the node 10 (FIG. 5).

In response to an inquiry into the state of processing rule setting from the processing rule setting devices 20a and 20c, the node 10, in which the processing rule has been set, returns the flow ID and the transaction ID as the processing rule setting state ((5) of FIG. 10).

Figure 11:
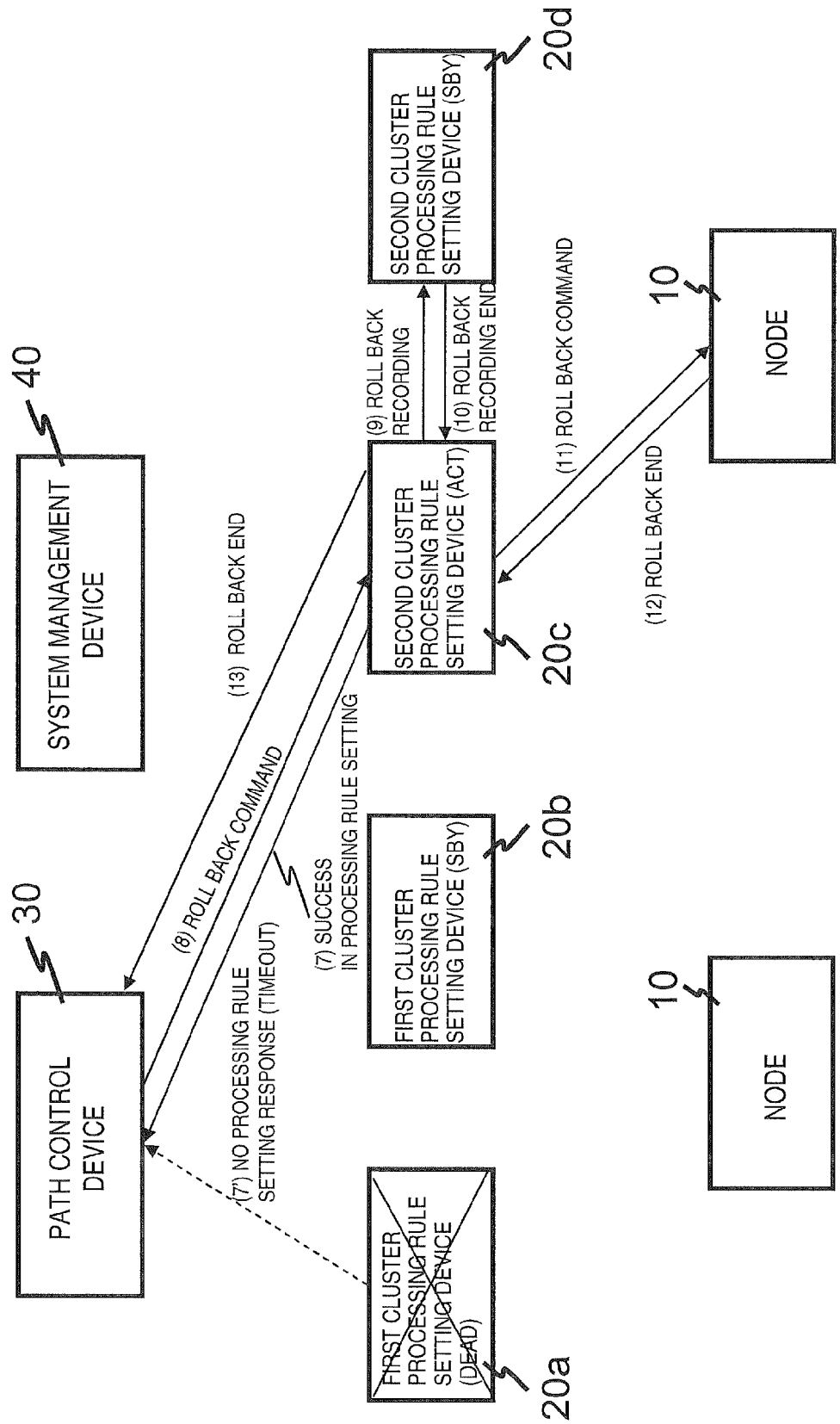
FIG. 11 is a schematic view continuing from FIG. 10.

Given that a failure has occurred in the processing rule setting device 20a and has been detected by the system management device 40, a regular flow ID and a regular transaction ID are returned from the processing rule setting device 20c as a response ((7) of FIG. 11). However, no response is returned from the processing rule setting device 20a ((7') of FIG. 11).

Since no response is returned from the processing rule setting device 20a (timing-out), the path control device 30 concludes that setting of a series of processing rules, having the relevant transaction ID concerned, ended up with a failure, and commands the processing rule setting device 20c to carry out rollback by designating the transaction ID concerned ((8) of FIG. 11).

On receiving a processing rule rollback command, the processing rule setting device 20c requests the processing rule setting device 20d, waiting in the standby system, to record the rollback contents ((9) of FIG. 11).

On receiving a notification concerning the end of recording of the rollback contents from the processing rule setting device 20d, so far waiting in the standby system ((10) of FIG. 11), the processing rule setting device 20c commands rollback to the node 10 where the designated transaction ID has been set ((11) of FIG. 11). Here, the processing of deleting the processing rule having the relevant transaction ID concerned from the flow table 15 of the node 10 is carried out. It is noted that, in case the processing rule was rewritten at (4) of FIG. 10, the processing rule setting device 20c references the processing rule setting log to write back the processing rule having the relevant transaction ID concerned.

In response to an inquiry from the processing rule setting device 20c about the rollback processing state, the node 10, which received the command for rollback, returns the flow ID and the transaction ID, by way of a notification concerning the rollback end ((12) of FIG. 11).

If, with the notification concerning the rollback end, the processing rule setting device 20c has confirmed that the rollback has been carried out correctly, it sends a notification concerning the rollback end to the path control device 30 ((13) of FIG. 11).

At this time point, the processing rules on the second cluster side, the integrity of which is not guaranteed, are deleted.

Subsequently, the system management device 40 activates the processing rule setting device 20b in place of activating the processing rule setting device 20a ((14) of FIG. 12). The processing rule setting device 20b then requests the node 10, which returned no response to the inquiry into the processing rule setting state, to send journal data including the flow ID and the transaction ID ((15) of FIG. 12).

Figure 12:
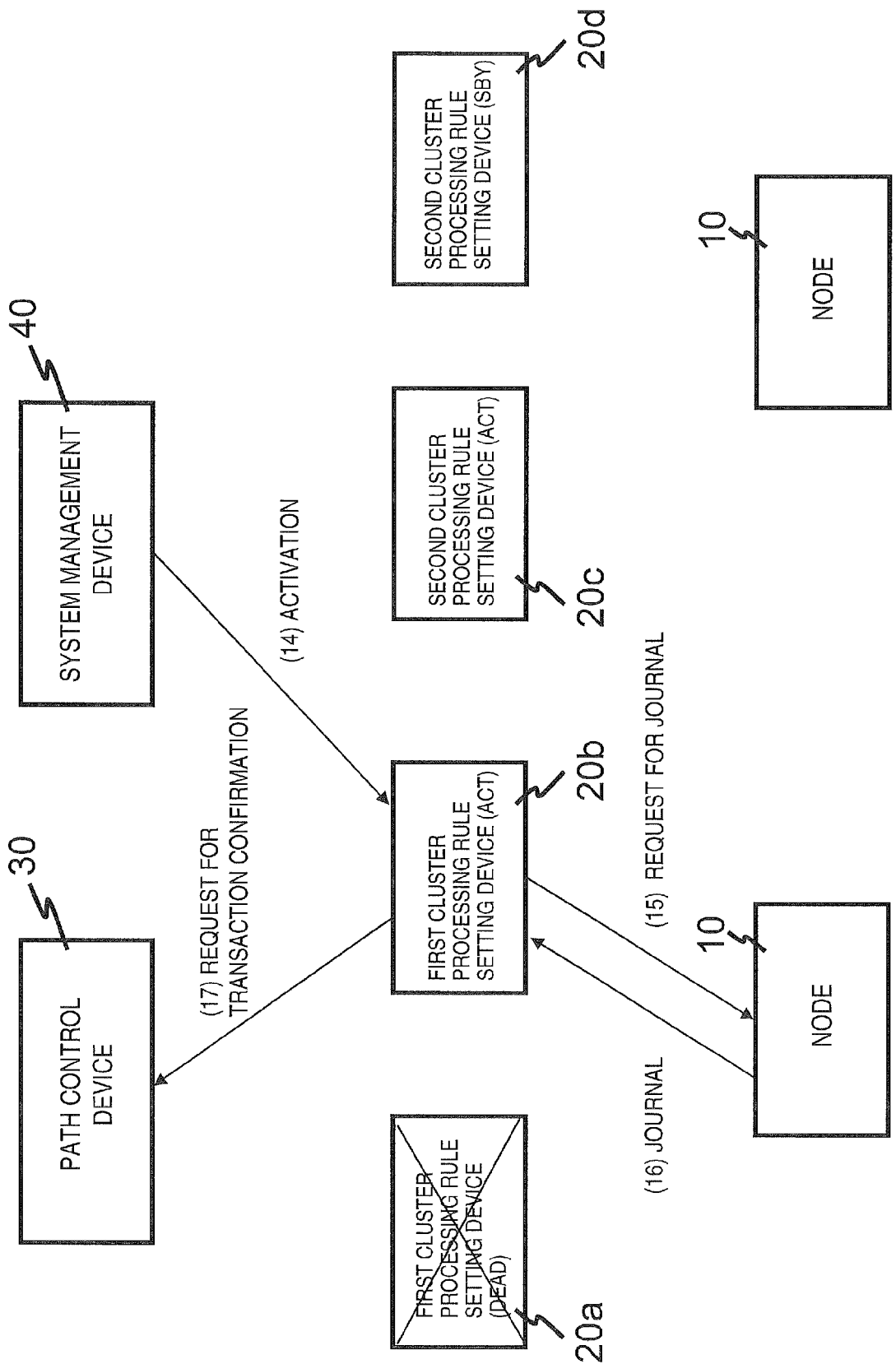
FIG. 12 is a schematic view continuing from FIG. 11.

On receiving the journal data send request, the node 10 returns the journal data including the flow ID and the transaction ID, by way of a notification of the flow table setting state ((16) of FIG. 12), the processing rule setting device 20b performs matching with the processing rule setting log 27 recorded at (2) of FIG. 10. Since here the processing rule setting was correctly performed at (4) of FIG. 10, the processing rule setting device 20b requests the path control device 30 to confirm whether or not the rollback is to be performed from a perspective of the entire transaction ((17) of FIG. 12).

On receiving the request for confirming whether or not rollback is to be carried out, the path control device 30 references the transaction log 34 to confirm whether or not the rollback is to be performed from the perspective of the entire transaction. Since here the rollback was already commanded to the processing rule setting device 20c, as explained at (8) and (11) in FIG. 11, the path control device 30 commands rollback to the processing rule setting device 20b ((18) of FIG. 13).

Figure 13:
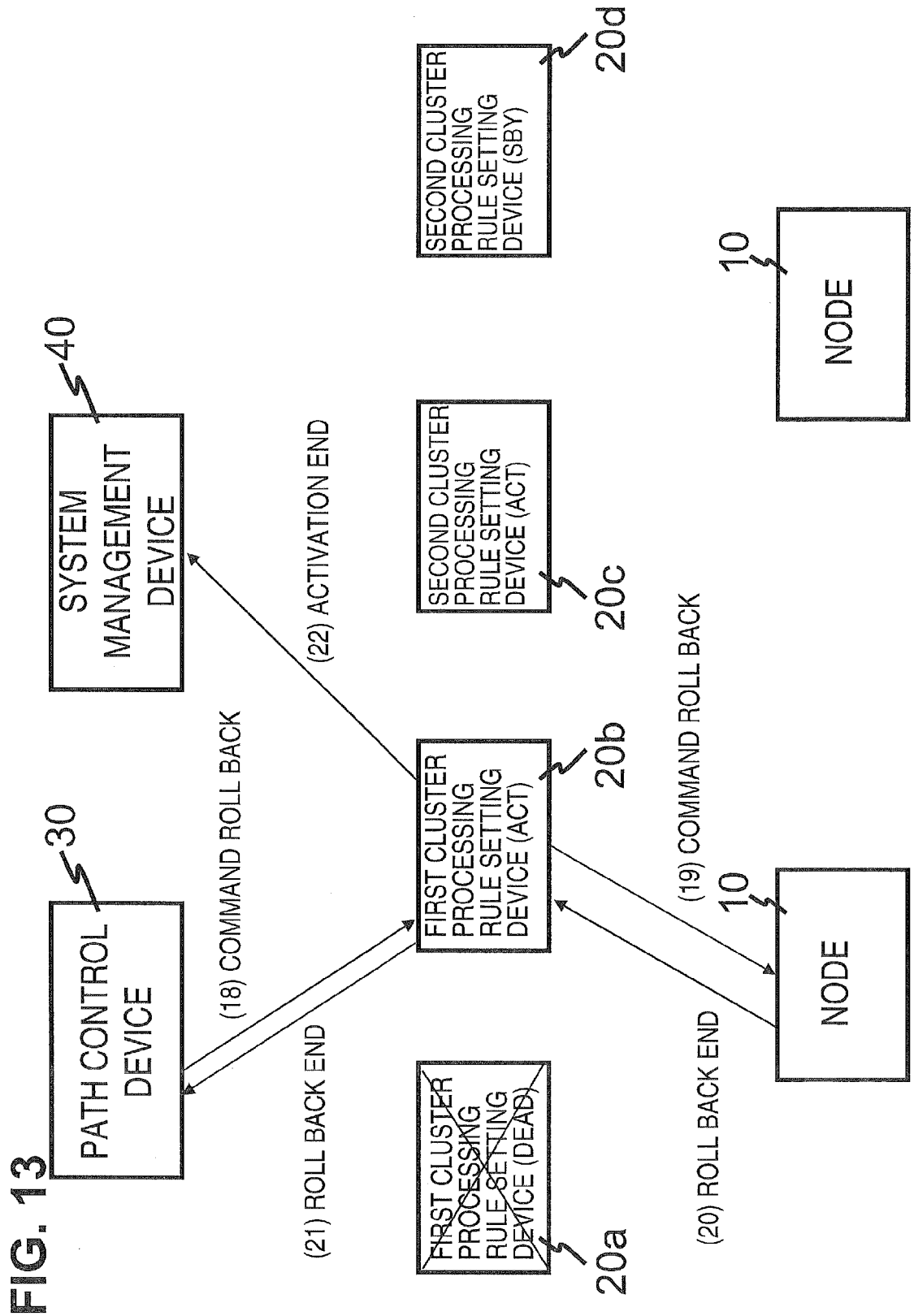
FIG. 13 is a schematic view continuing from FIG. 12.

On receiving the rollback command, the processing rule setting device 20b commands rollback to the node 10 specified ((19) of FIG. 13). Here, the processing of deleting the processing rule set (registered) at (4) of FIG. 10 from the flow table 15 of the node 10 is carried out.

In response to the inquiry into the rollback processing state from the processing rule setting device 20b, the node 10, which has received the rollback command, returns the flow ID and the transaction ID, by way of notification of the rollback end ((20) of FIG. 13).

With the notification of the rollback end, the processing rule setting device 20b is able to confirm that the rollback has correctly been carried out. The processing rule setting device 20b then transmits a notification of the rollback end to the path control device 30 ((21) of FIG. 13).

At a stage where the above mentioned sequence of processing operations has come to a close, the processing rule setting device 20b notifies the system management device 40 of the end of activation ((22) of FIG. 13).

With the above mentioned processing stage, the processing rules on the first cluster side, whose integrity is not guaranteed, has also been deleted. The path control device 30 may again request the processing rule setting devices 20b, 20c to set the processing rules, thereby enabling setting of an as-intended processing rule in an as-intended node.

Moreover, in the configuration of the present exemplary embodiment, not only may the integrity be maintained in setting the processing rules, but also the control device is functionally distributed into a processing rule setting device portion and a path control device portion. In addition, the individual processing rule setting devices are formulated in a plurality of clusters, and the processing rule setting devices of each cluster are formed redundantly, viz., there are provided a plurality of redundant processing rule setting devices for each cluster. This results in distribution of the load of the individual processing rule setting devices. Furthermore, if a given processing rule setting device has failed, the operation may be shifted to a standby system device to continue rendering of services, thereby assuring a high degree of usability.

Exemplary Embodiment 2

In the above described exemplary embodiment 1, explanation has been given on the case where the rollback is carried out by referencing the processing rule setting log memory 27 arranged on the processing rule setting device side. Also there is a possible configuration, however, in which a processing rule setting log is owned by the node 10, such that rollback may be carried out on the node side.

An exemplary embodiment 2 of the present disclosure, in which the rollback is carried out on the node side, will now be explained. It is noted that, in the following explanation, the description on the matter common to the exemplary embodiment 1 is dispensed with and mainly the point of difference from the exemplary embodiment 1 will be explained.

Figure 14:
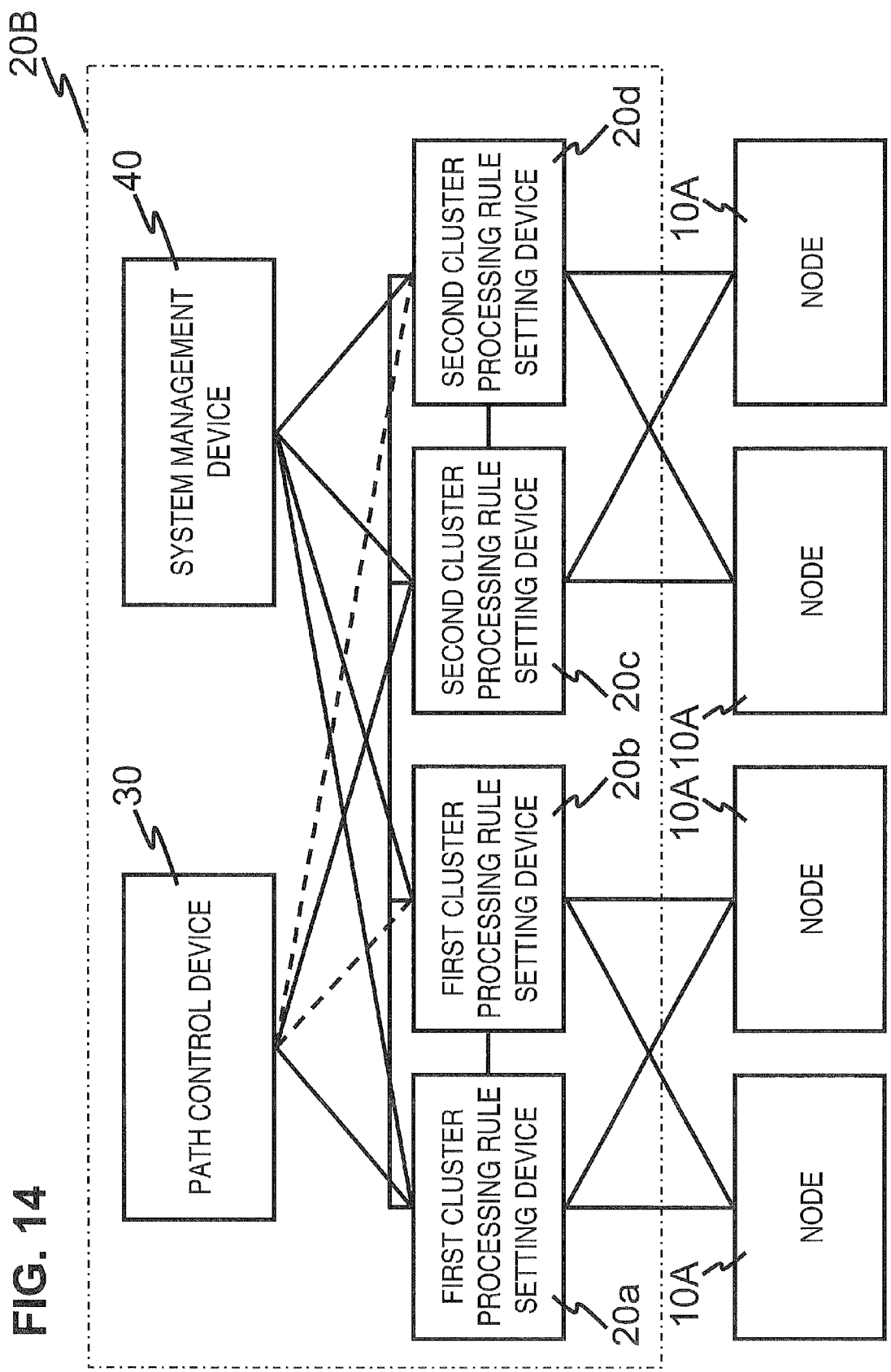
FIG. 14 is a diagrammatic view showing a configuration of an exemplary embodiment 2 of the present disclosure.

FIG. 14 shows the configuration of the exemplary embodiment 2 of the present disclosure. The point of difference from the exemplary embodiment 1 resides in that processing rule setting devices belonging to the different clusters are interconnected and are able to acquire respective processing rule setting logs. The elements surrounded by a chain-dotted line (Reference Signs 20B in FIG. 14) are correspond to the control device 20A of the abovementioned first exemplary embodiment.

Figure 15:
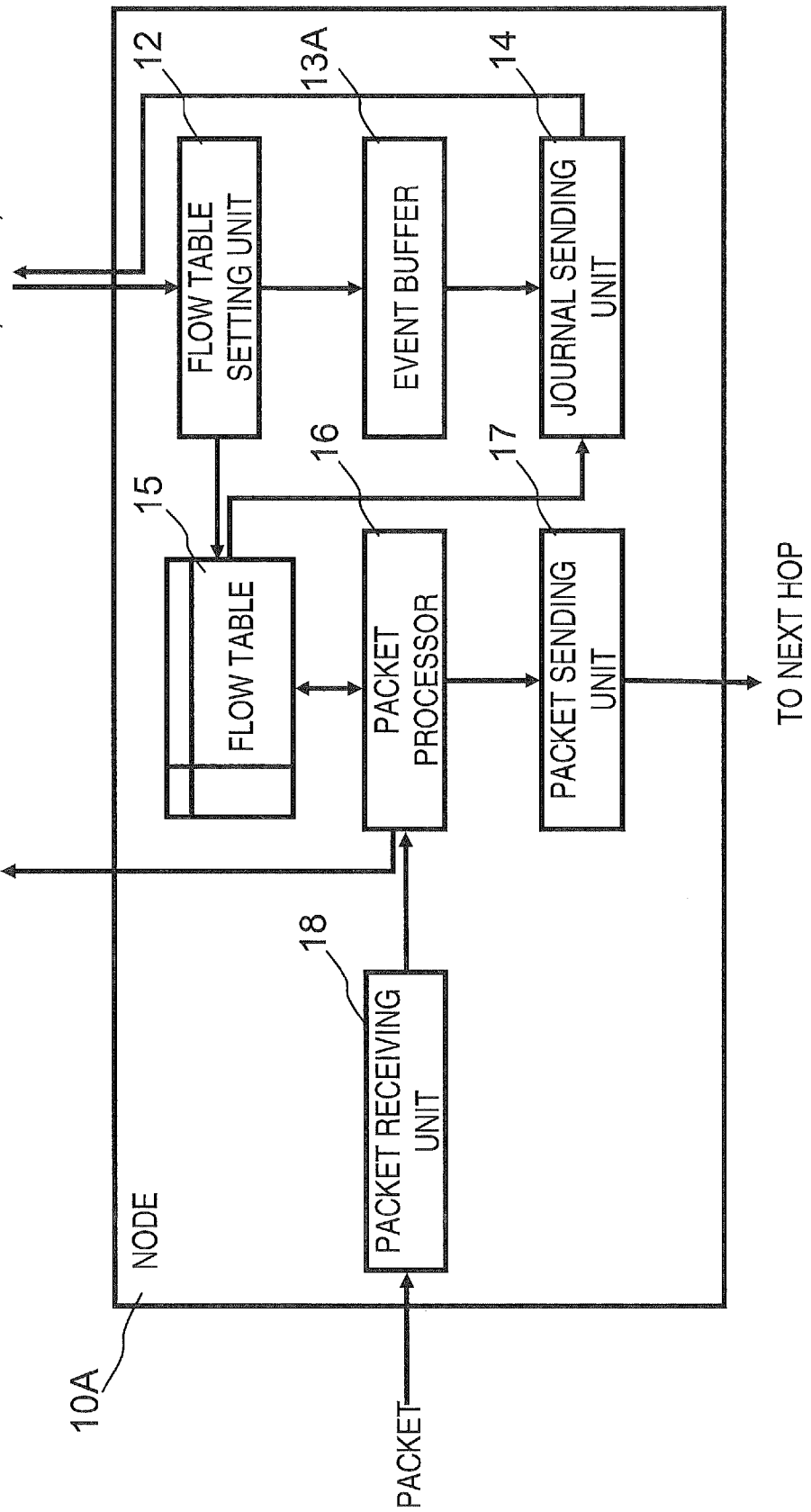
FIG. 15 is a block diagram for illustrating a configuration of a node of the exemplary embodiment 2.

FIG. 15 depicts a block diagram showing the configuration of a node of the exemplary embodiment 2 of the present disclosure. The point of difference from the node 10 of the exemplary embodiment 1 shown in FIG. 3 is that not a pointer to a flow table alone is buffered, but a pre-rewrite processing rule is also buffered along with the pointer in an event buffer 13A.

Figure 16:
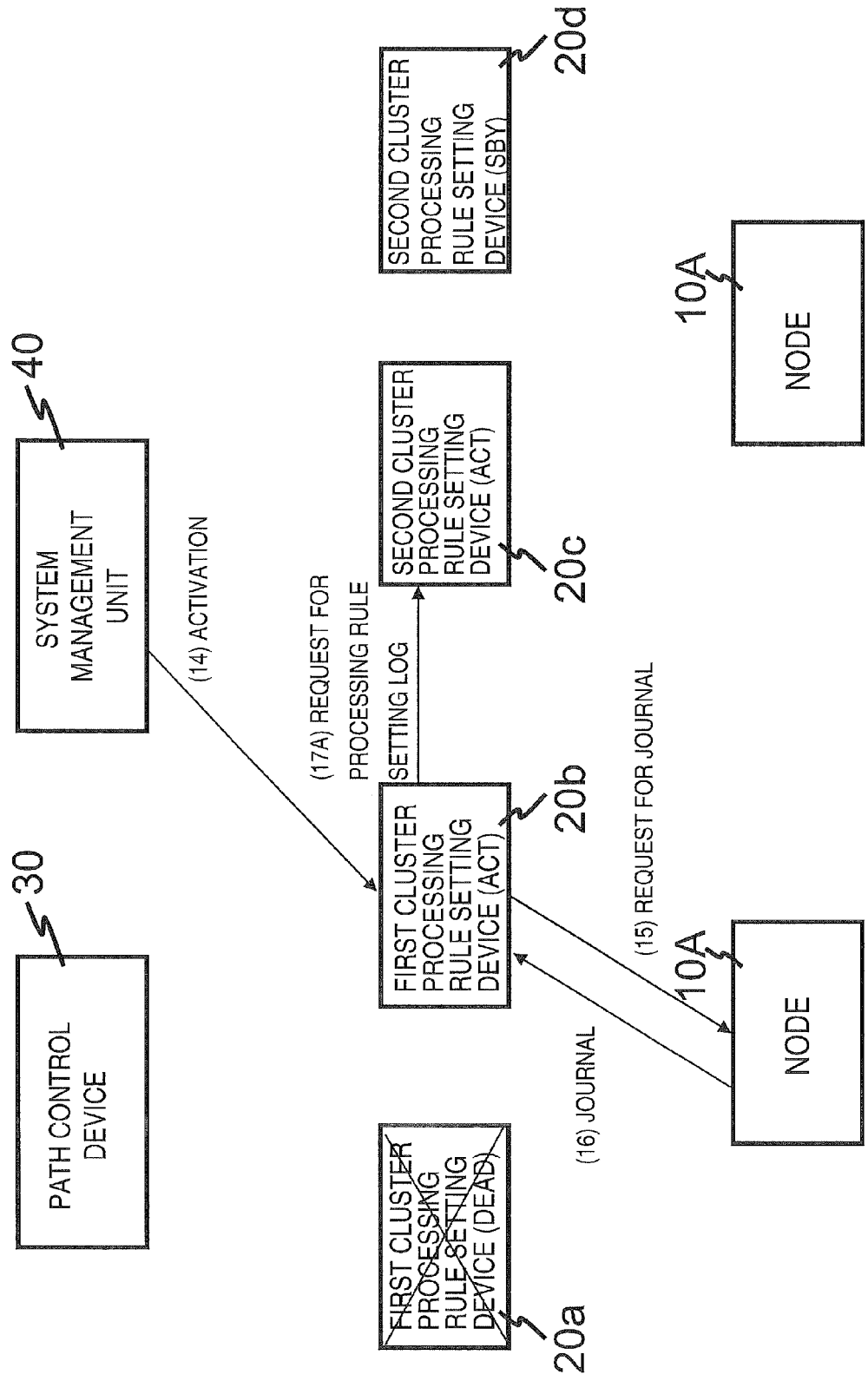
FIG. 16 is a schematic view for illustrating an example operation of the exemplary embodiment 2.
Figure 17:
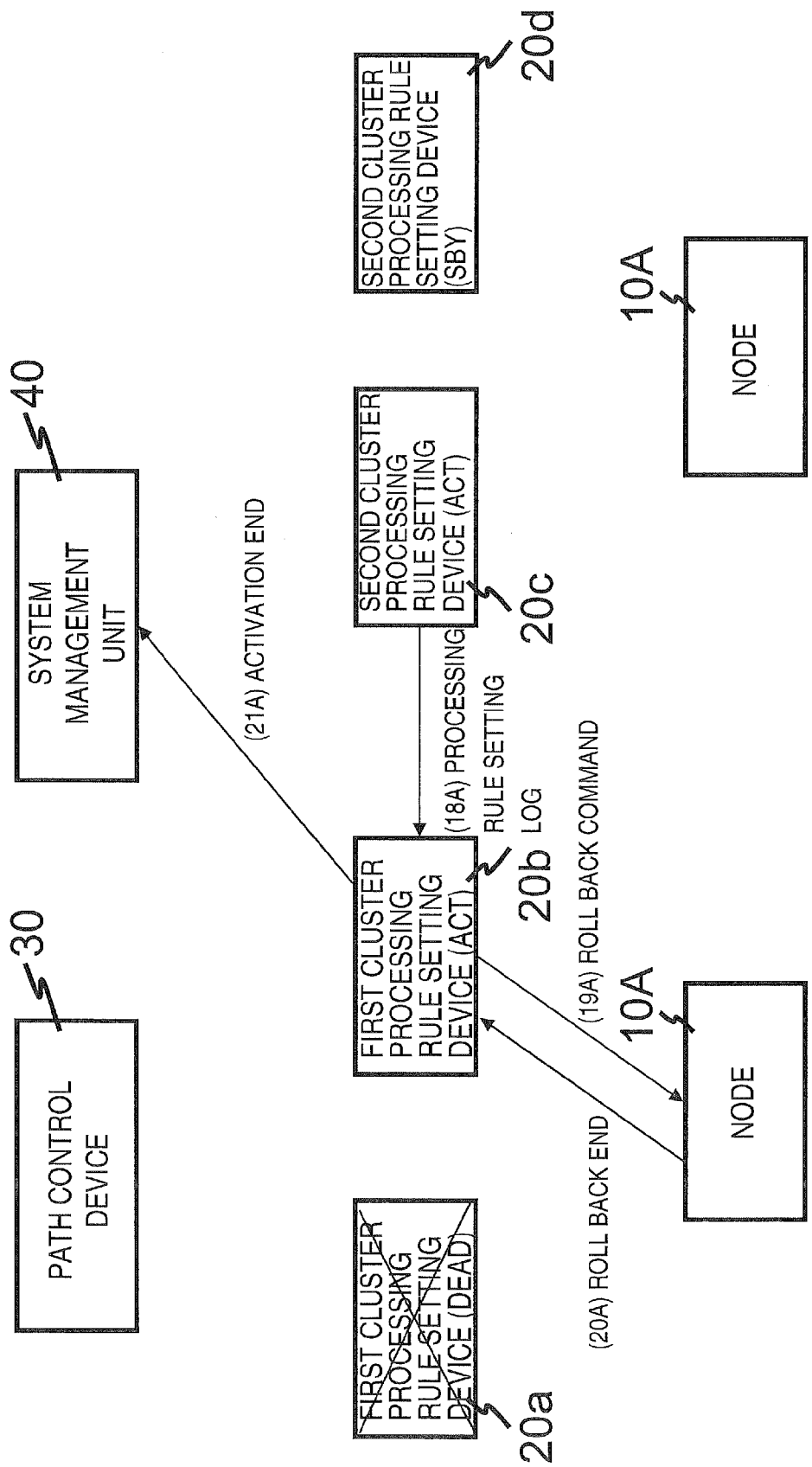
FIG. 17 is a schematic view continuing from FIG. 13.

The operation of the present exemplary embodiment will now be explained in detail with reference to the drawings. FIGS. 16 and 17 depict block diagrams to explain an example operation of the exemplary embodiment 2. The operation until the system management device 40 activates a processing rule setting device 20b, with there being no processing rule setting response to the request for setting the processing rule from the processing rule setting device of the first cluster 20a, is similar to the operation in the exemplary embodiment 1. Hence, the corresponding explanation is dispensed with.

The processing rule setting device 20b, activated at (14) of FIG. 16, requests a node 10A to send journal data ((15) of FIG. 16). It is noted that no response was made from the node 10A to an inquiry about the processing rule setting state.

The node 10A, which received the request to send journal data, returns journal data including the flow ID and the transaction ID as a response ((16) of FIG. 16). The processing rule setting device 20b performs matching of received data to the processing rule setting log 27 recorded at (2) of FIG. 10. Here, the processing rule was correctly set at (4) of FIG. 10. The processing rule setting device 20b thus requests the processing rule setting device of the second cluster 20c to send the processing rule setting log 27 of the processing rule setting device 20c ((17A) of FIG. 16).

On receiving the processing rule setting log 27 from the processing rule setting device 20c ((18A) of FIG. 17), the processing rule setting device 20b performs matching of the processing rule setting log 27 of the processing rule setting device 20c to the journal data of the node 10A received at (16) of FIG. 16.

Here, the journal data of the node 10A, received at (16) of FIG. 16, takes lead to the processing rule setting log 27 of the processing rule setting device 20c. It is because rollback has been already commanded to the processing rule setting device 20c as explained at (8) and (11) of FIG. 11. Hence, the processing rule setting device 20b commands rollback to the node 10A along with designating the transaction ID ((19A) of FIG. 17).

The node 10A carries out the rollback, using the above mentioned processing rule setting log. Then, in response to an inquiry by the processing rule setting device 20b about the rollback processing state, the node 10A returns the flow ID and the transaction ID by way of a notification of the rollback end ((20A) of FIG. 17).

When the processing rule setting device 20b has confirmed, by the notification concerning the rollback end, that rollback has completed correctly, the processing rule setting device 20b transmits a notification concerning the completion of activation (activation end) to the system management device 40 ((21A) of FIG. 17).

With the above mentioned stage, deletion of processing rules on the first cluster side, whose consistency is not guaranteed, has been completed in the present exemplary embodiment. The path control device 30 again requests the processing rule setting devices 20b, 20c to set processing rules, as necessary, thereby enabling setting of an as-intended processing rule in an as-intended node.

With the node 10A now owning the processing rule setting log, as in the present exemplary embodiment, it is possible to properly carry out rollback, even with a configuration in which the node side holds setting contents of past processing rules.

Exemplary Embodiment 3

An exemplary embodiment 3, in which a commit request/commit response is carried out between the path control device 30 and the processing rule setting devices 20a to 20d, will now be explained. Since the present exemplary embodiment 3 of the present disclosure may be implemented with a configuration equivalent to that of the exemplary embodiment 1 or 2, the operation of the exemplary embodiment 3 will be explained in detail with reference to the sequence block diagrams of FIGS. 18 to 36.

(1. Regular Ending)

Initially, the sequence of operations in case processing rules have been correctly set in the nodes 10 of the first and second clusters will be explained with reference to FIG. 18.

In case an unknown packet is forwarded from the node 10 (step S000 of FIG. 18), the path control device 30 calculates a forwarding path for the packet in order to prepare processing rules that implement the packet forwarding path. The path control device 30 requests the processing rule setting devices 20a, 20c, operating in the active system (ACT), to set the so prepared processing rules (step S001 of FIG. 18).

Figure 18:
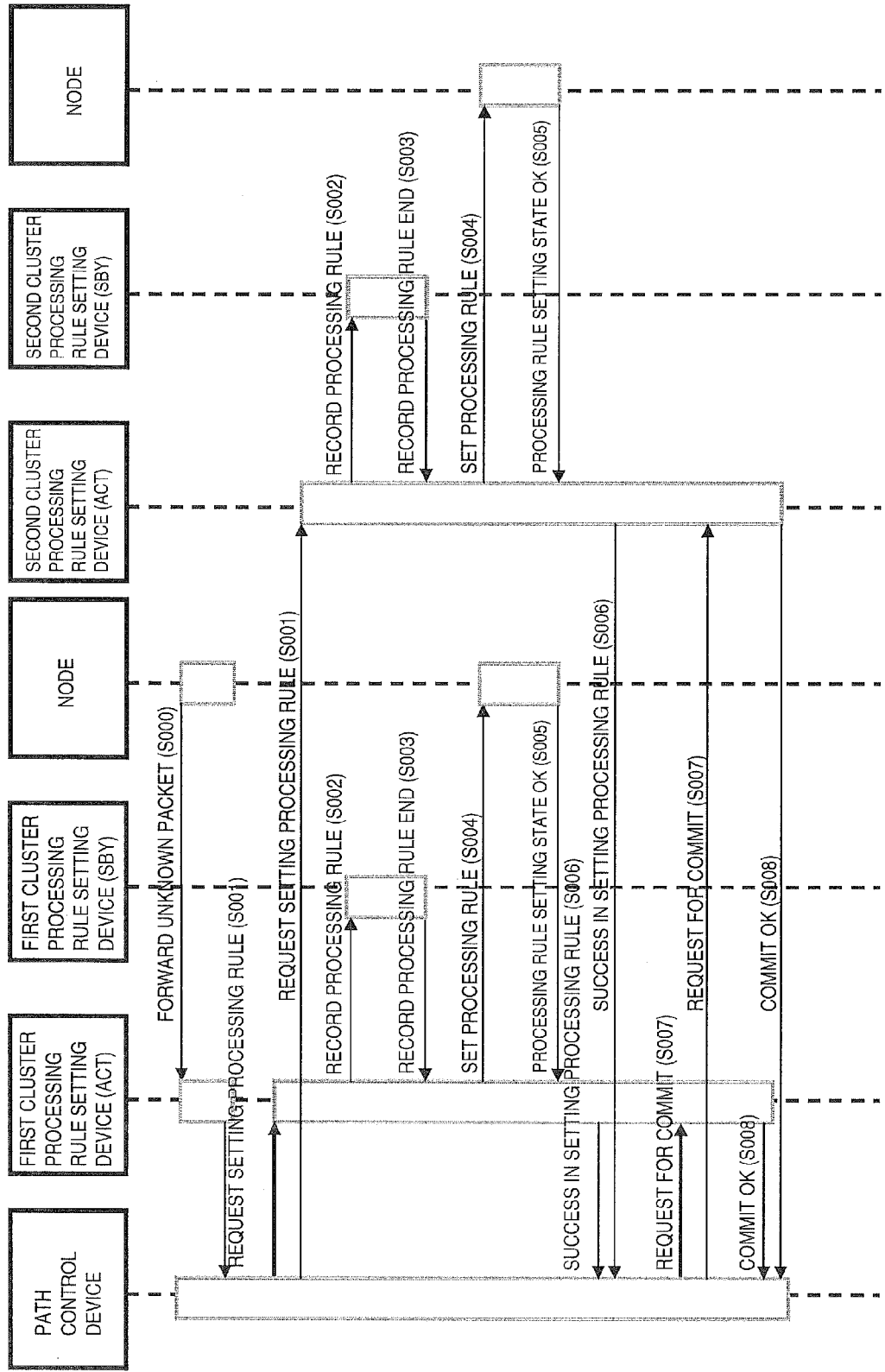
FIG. 18 is a sequence diagram for illustrating the operation (regular update) of an exemplary embodiment 3 of the present disclosure.

On receiving the request for setting the processing rules, the processing rule setting devices 20a, 20c respectively request the processing rule setting devices 20b, 20d in the standby system (SBY) to record processing rules (step S002 of FIG. 18).

On receiving the notifications of the recording end of the processing rules from the processing rule setting devices 20b, 20d (step S003 of FIG. 18), the processing rule setting devices 20a, 20c set the processing rules in the nodes specified by the path control device 30 (step S004 of FIG. 18).

The processing rule setting devices 20a, 20c inquire at the nodes, specified by the path control device 30, about the processing rule setting states, and receive the corresponding results (step S005 of FIG. 18).

The processing rule setting devices 20a, 20c then transmit the processing rule setting states to the path control device 30 (step S006 of FIG. 18). Since the processing rules have been correctly set in the nodes, the path control device 30 requests a commit to each of the processing rule setting devices 20a, 20c (step S007 of FIG. 18).

On receiving a commit OK from the processing rule setting devices 20a, 20c, the path control device 30 deems that the sequence of processing rules has correctly been set. Hence, the transaction is brought to an end.

(2. Rollback Operation Due to Node Failure)

Figure 19:
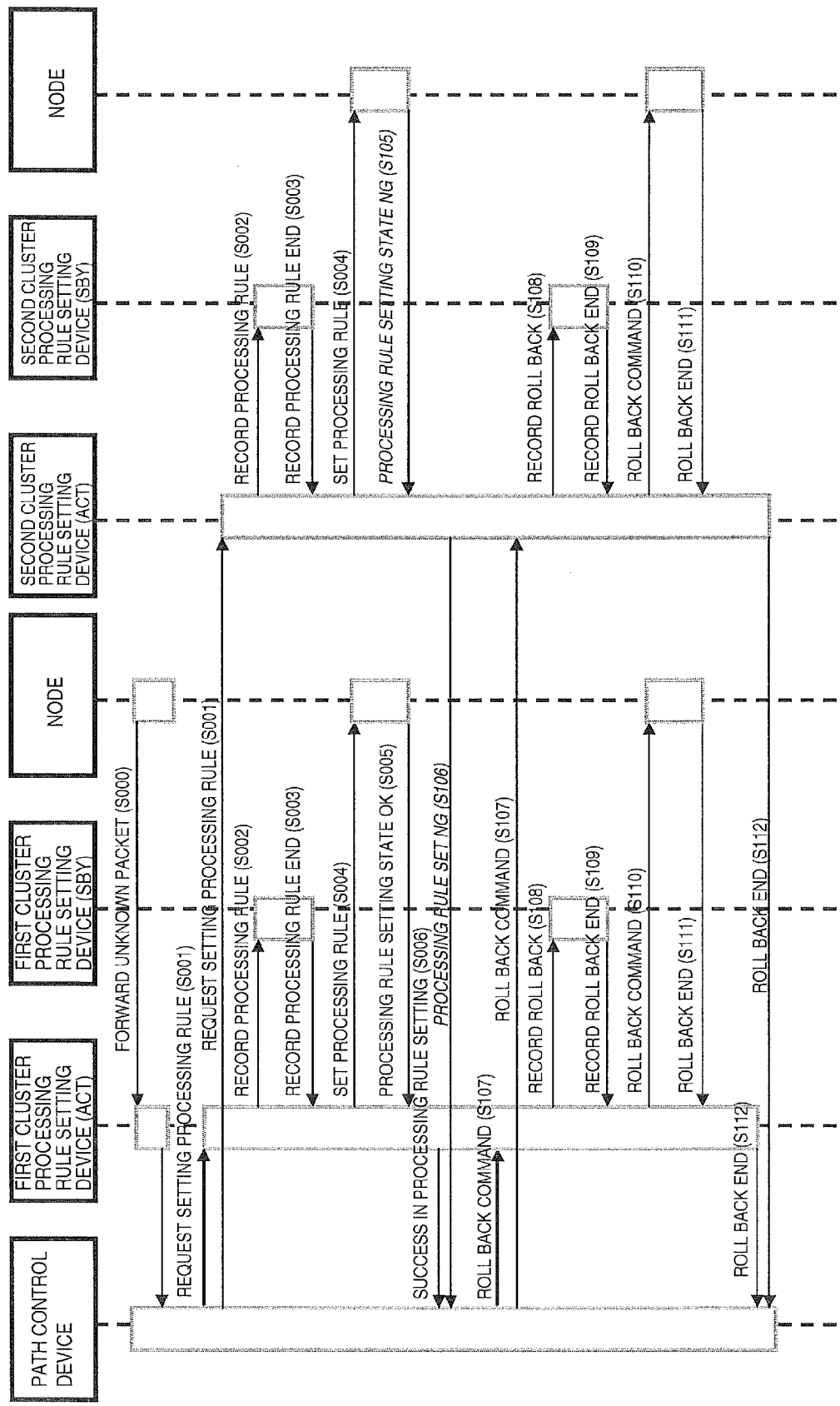
FIG. 19 is a sequence diagram for illustrating the operation (non-regular node update) of the exemplary embodiment 3.

Referring to FIG. 19, the rollback operation for the case where there occurred a failure in the setting states of the processing rules from the nodes 10 will be explained. Since the operation from the step S000 up to step S006 of FIG. 19 is the same as that from the step S000 up to step S006 of FIG. 18, the corresponding description is dispensed with.

In the case of FIG. 19, the setting states of the processing rules, returned from the nodes 10 of the second cluster, are not consistent at a step S105 with those as comprehended on the side the processing rule setting device 20c. It is noted that, in FIG. 10 et seq., such case is represented as being in a processing rule setting state NG.

On receiving the processing rule setting states, the processing rule setting device 20c sends the flow ID and the transaction ID, received from the node 10 of the second cluster, to the path control device 30, as the processing rule setting states (S106 of FIG. 19).

The path control device 30 receives the correct flow ID and the correct transaction ID from the processing rule setting device 20a (S005 of FIG. 19), but receives an incorrect flow ID and an incorrect transaction ID from the processing rule setting device 20c (NG at S106 of FIG. 19). The path control device thus concludes that the setting of the sequence of processing rules, having the relevant transaction ID, ended up with a failure. The path control device then commands a rollback to the processing rule setting devices 20a, 20c, along with the transaction ID (S107 of FIG. 19).

Thereafter, as at the time of setting the processing rules, rollback is commanded to each node 10 (S110 of FIG. 19) after the recording and the end of the recording in the processing rule setting devices 20b, 20d in the standby system (S108 and S109 of FIG. 19). Finally, at a stage of receipt of the notifications of the end (completion) of rollback from the processing rule setting devices 20a, 20c, the path control device concludes that the rollback of the sequence of the processing rules has correctly been carried out to end the transaction.

In the present exemplary embodiment, described above, rollback processing may be carried out correctly, even in case of occurrence of failure in processing rule setting in the node 10, based on contents delivered from the processing rule setting device 20a of the other cluster.

(3-1. Switching of Processing Rule Setting Devices Following the End of a Transaction)

Given that, after a sequence of correct processing operations is finished as shown in FIG. 18, failure occurred in the processing rule setting device 20a, for example, and the system management device 40 activated the processing rule setting device of the standby system, a sequence of succeeding operations will now be explained with reference to FIG. 20. The operation of the steps S000 up to S008 of FIG. 20 is similar to that of the steps S000 up to S008 of FIG. 18, and hence the corresponding description is dispensed with.

Figure 20:
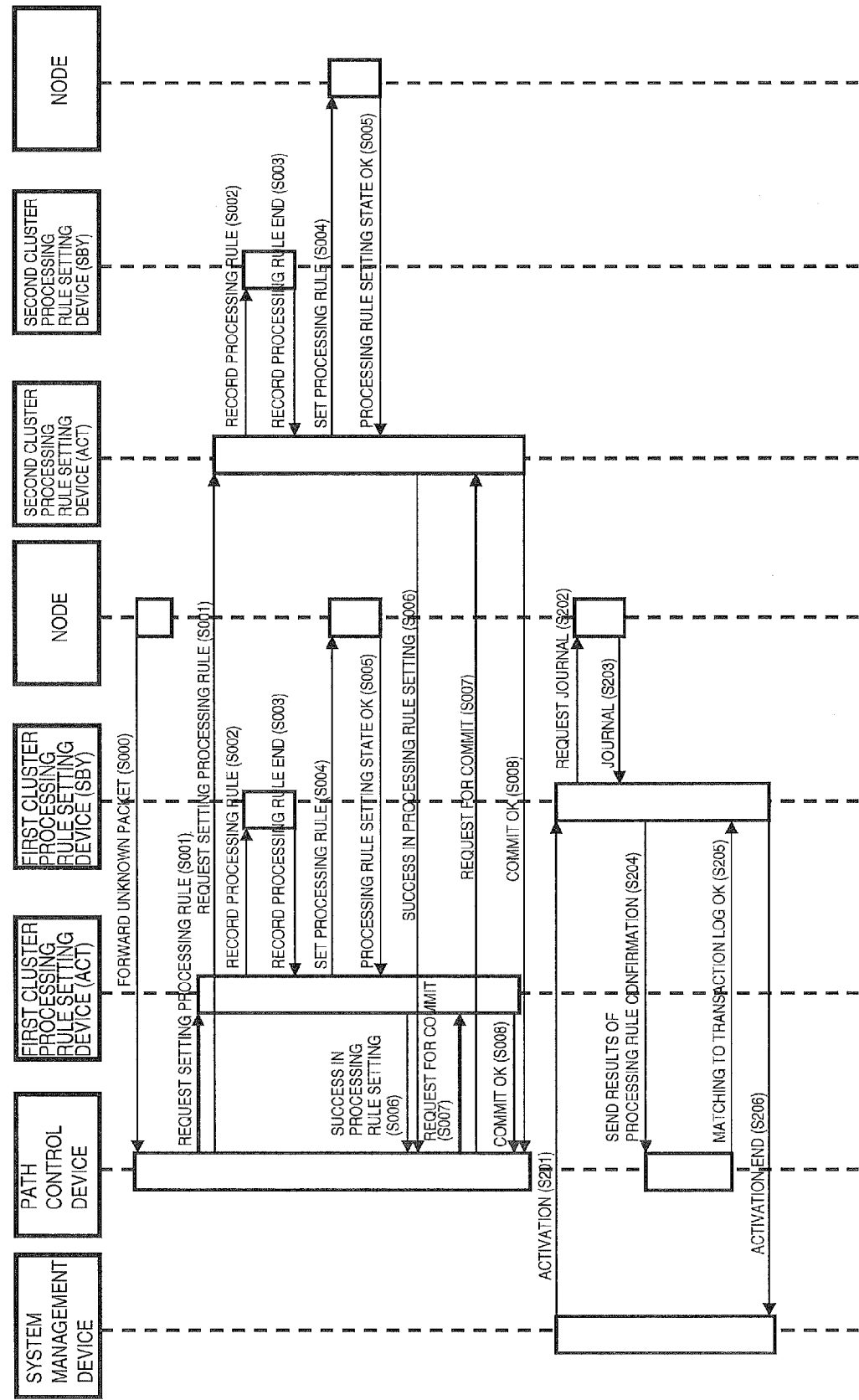
FIG. 20 is a sequence diagram for illustrating the operation (failure state of the processing rule setting device following the end of a transaction) of the exemplary embodiment 3.

The system management device 40 then activates the processing rule setting device 20b so far waiting in the standby system (S201 of FIG. 20). The processing rule setting device 20b requests the node 10 to send journal data that includes the flow ID and the transaction ID (202 of FIG. 20).

On receiving the journal data from the node 10 (S203 of FIG. 20), the processing rule setting device 20b performs matching of the data received with the setting hysteresis (hystroy) of the processing rules stored in its processing rule setting log memory 27 followed by transmitting the result of matching to the path control device 30 (S204 of FIG. 20).

The path control device 30 references the transaction log 34 to make sure that the transaction as confirmed by the result of the matching has completed successfully. The path control device then returns an acknowledgement response (matching to the transaction log OK) to the processing rule setting device 20b (S205 of FIG. 20).

On receiving the acknowledgement response (matching to the transaction log OK), the processing rule setting device 20b notifies the system management device 40 of the fact of the end of activation (S206 of FIG. 20).

(3-2. Switching of the Processing Rule Setting Devices Due to Node Failure Following the Rollback End)

Figure 21:
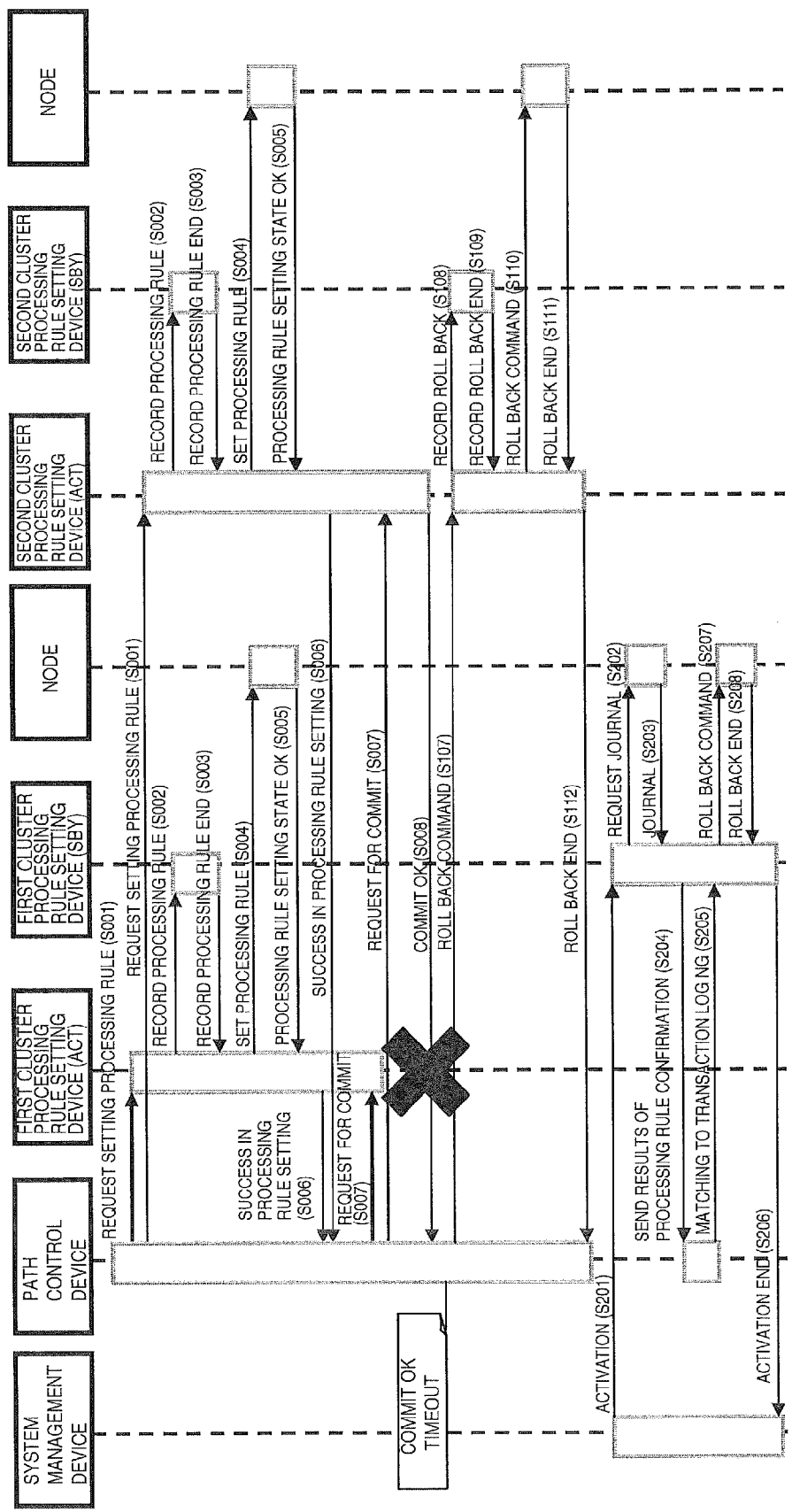
FIG. 21 is a sequence diagram for illustrating the operation (failure state of node update and failure state of processing rule setting device following the end of a transaction) of the exemplary embodiment 3.

Given that, after the rollback end brought about by failed processing rule setting states from the node 10, the system management device 40 activated the processing rule setting devices of the standby system, the sequence of succeeding operations is as follows. It is noted that the operation of the steps S000 up to S112 of FIG. 21 is similar to that of the steps S000 up to S112 of FIG. 19, and hence the corresponding description is dispensed with.

The next following operations are like those of the steps S201 to S205. However, rollback has completed in the processing rule setting device 20c, as confirmed by referencing the transaction log 34. Hence, the path control device 30 commands rollback to the processing rule setting device 20b as well (S207 of FIG. 21).

At a stage a notification of the rollback end is received from the processing rule setting device 20b (S208 of FIG. 21), the path control device 30 notifies the system management device 40 of the fact that activation has completed (S206 of FIG. 20).

The processing rule setting device in the activated state confirms whether or not the processing rules as set in the node is synchronized with the processing rule comprehended by the setting device itself. In addition, the processing rule setting device carries out matching to the transaction log, as described above. Thus, even in case the processing rule setting devices are switched by the system management device 40, integrity of the processing rules set in the respective nodes is not lost.

(4. Failure in the Processing Rule Setting Device Before the End of the Setting of Processing Rules or Before the End of Rollback)

The operation in the case of failure of a processing rule setting device of the active system that occurred at some time as from the time of a request for processing rule setting until commit OK (end of rollback), will now be explained for each of a plurality of different timings of failure occurrence.

Figure 22:
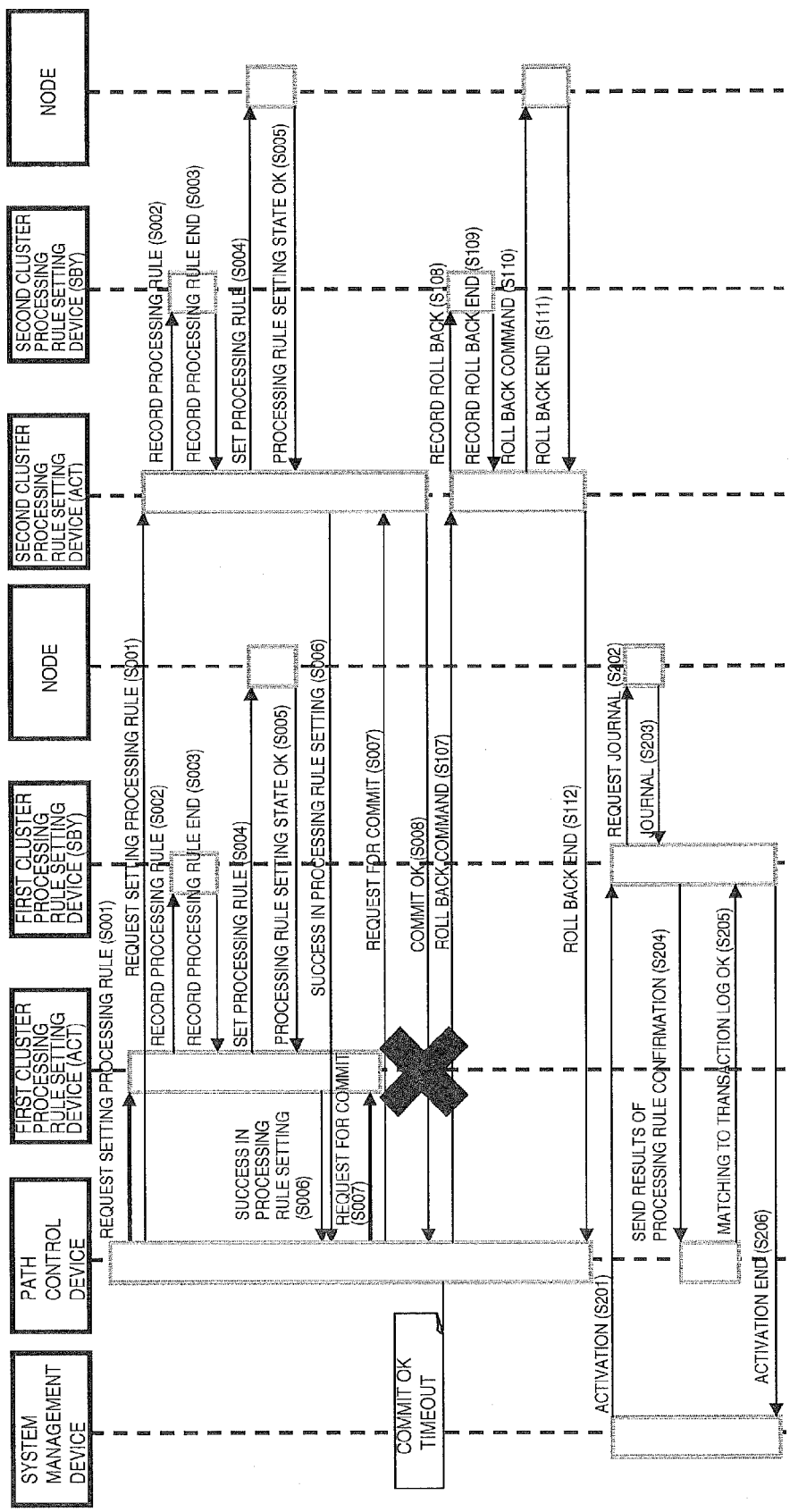
FIG. 22 is a sequence diagram for illustrating the operation (failure state of the processing rule setting device before receipt of a commit response) of the exemplary embodiment 3.

FIG. 22 depicts a sequence diagram showing the operation in case the commit OK has not been sent from one of the processing rule setting devices (processing rule setting device 20a) in response to a commit request following the regular setting of the processing rules. In such case, the path control device 30 commands rollback to the processing rule setting device 20c from which commit OK was sent, as in the case explained in connection with the exemplary embodiment 1 with reference to FIG. 11. The concrete operations are the same as the steps S108 to S111 of FIG. 19. Subsequently, the switching of the processing rule setting devices by the system management device 40 and the acquisition/matching of the journal data are carried out as explained with reference to FIG. 20. Since the rollback has already been commanded to the processing rule setting device 20c, rollback is commanded by the path control device 30 to the activated processing rule setting device 20b as well.

Figure 23:
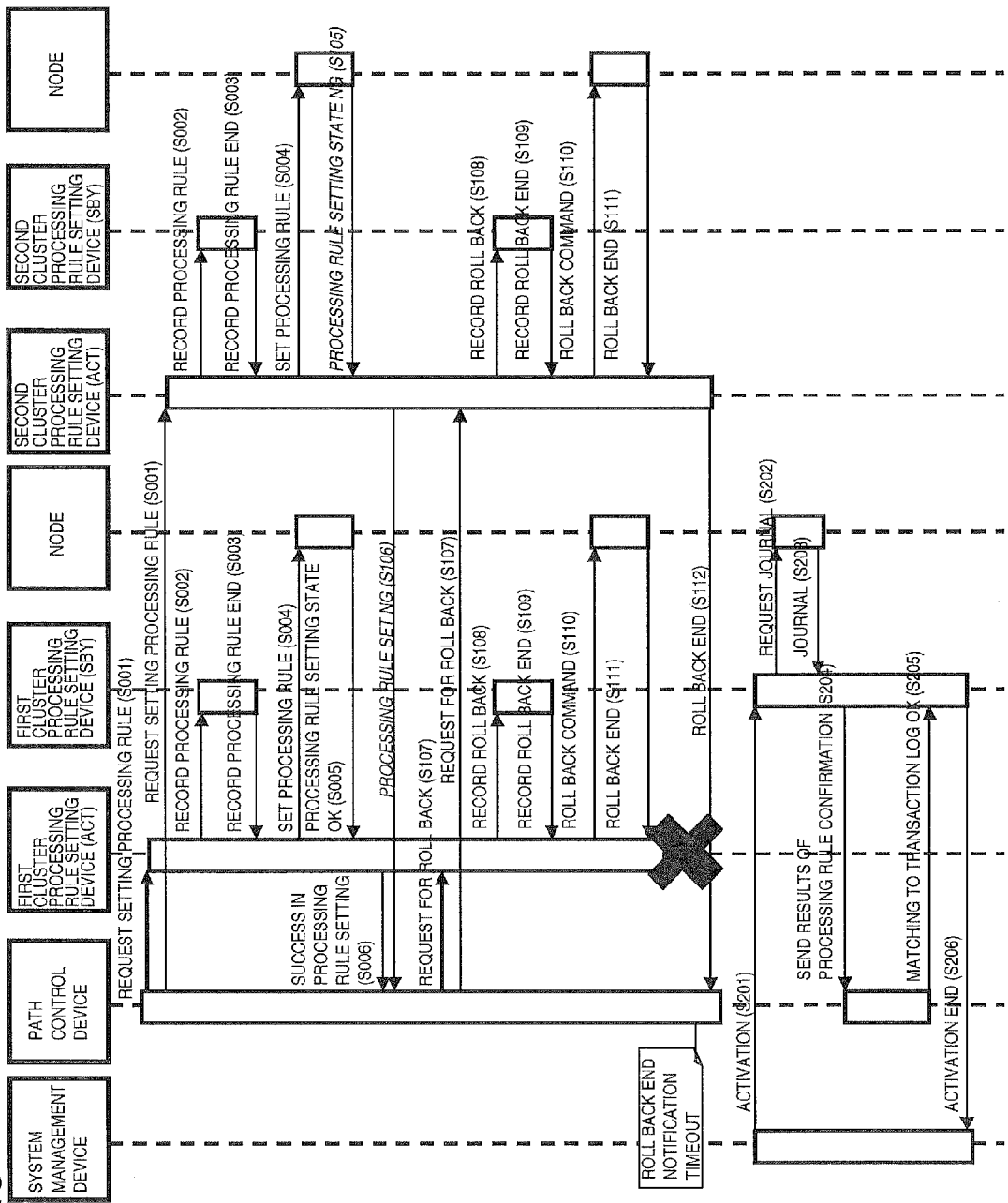
FIG. 23 is a sequence diagram for illustrating the operation (failure state of node update and failure state of the processing rule setting device before receipt of the commit response) of the exemplary embodiment 3.

FIG. 23 depicts a sequence diagram showing the operation in case there is a failure in the processing state setting state from the node 10, such that, after carrying out the rollback operation, no rollback end notification has been sent from the processing rule setting device 20a. In this case, switching of the processing rule setting devices by the system management device 40 and acquisition/matching of the journal data are carried out in the same way as in FIG. 22. However, since the processing of rollback in the node 10 has completed as regularly, activation comes to a close straightforwardly.

Figure 24:
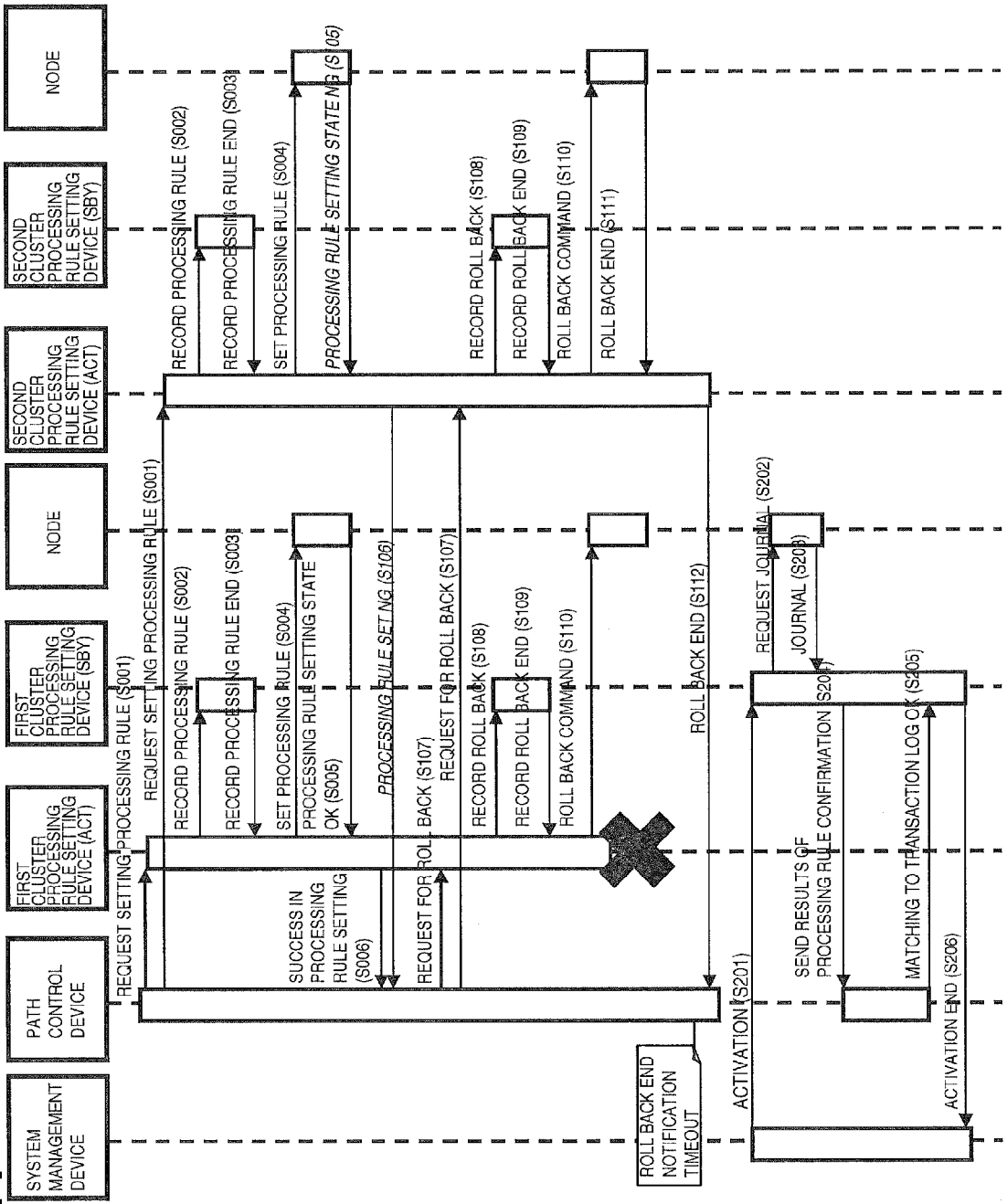
FIG. 24 is a sequence diagram for illustrating the operation (failure state of node update and failure state of the processing rule setting device before receipt of the notification of the end of rollback) of the exemplary embodiment 3.

FIG. 24 depicts a sequence diagram showing the operation in case there occurred a failure in the processing state setting state from the node 10, such that, after carrying out the rollback operation, the processing rule setting device 20a failed before receiving the notification concerning the rollback end from the node 10. In this case, switching of the processing rule setting devices by the system management device 40 and acquisition/matching of the journal data are carried out in the same way as in FIG. 22. However, since the processing of rollback in the node 10 has completed as regularly, activation comes to a close straightforwardly.

Figure 25:
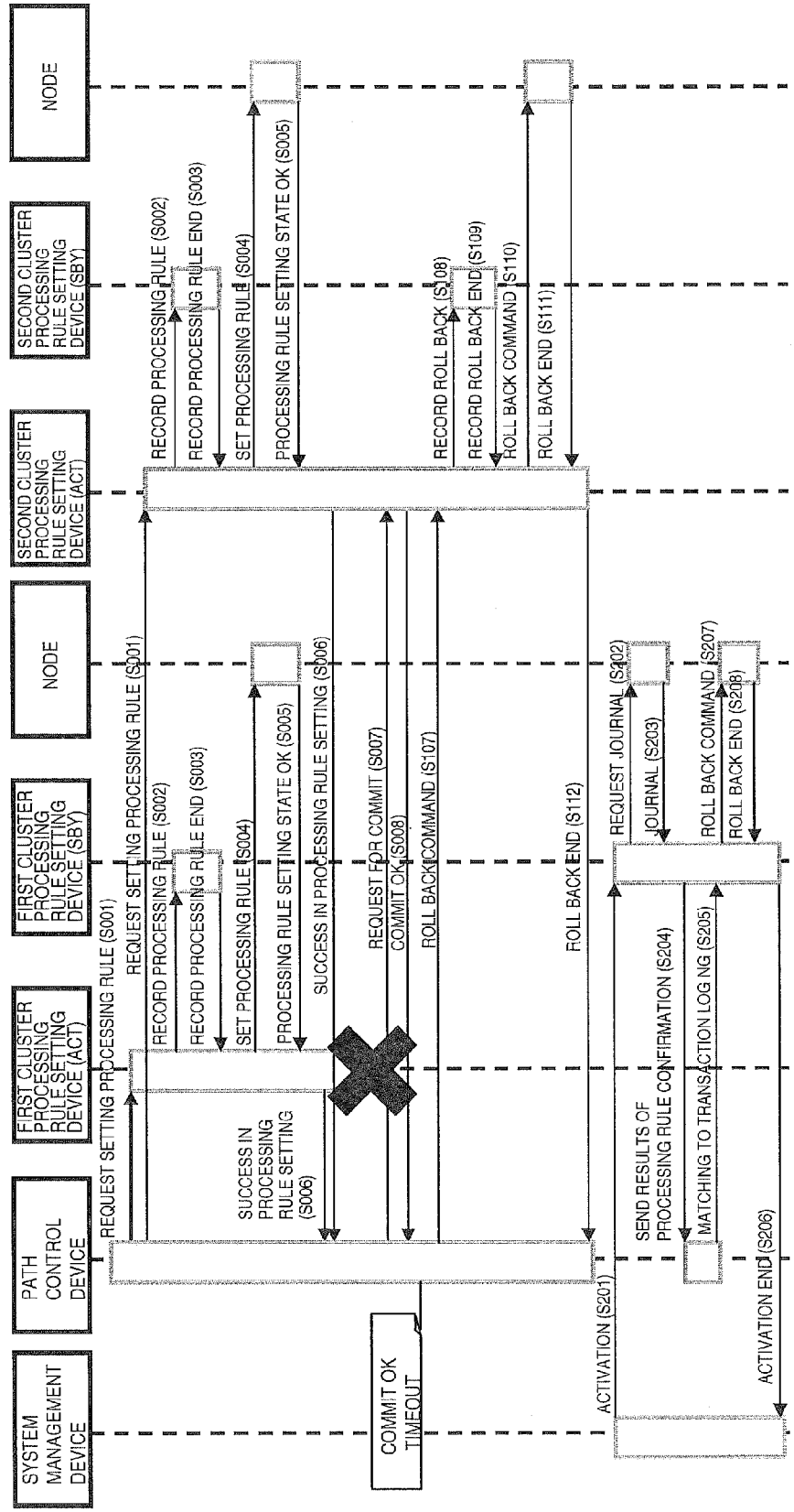
FIG. 25 is a sequence diagram showing the operation (failure state of the processing rule setting device before sending a commit request) of the exemplary embodiment 3.

FIG. 25 depicts a sequence diagram showing the operation in case no commit OK has been sent from the processing rule setting device 20a in response to a request for a commit following the regular setting of the processing rule, in the same way as in FIG. 22. The difference from FIG. 22 is that the processing rule setting device of the first cluster failed before receiving the commit request. The overall operation is the same as that of FIG. 22 and hence the corresponding explanation is dispensed with.

Figure 26:
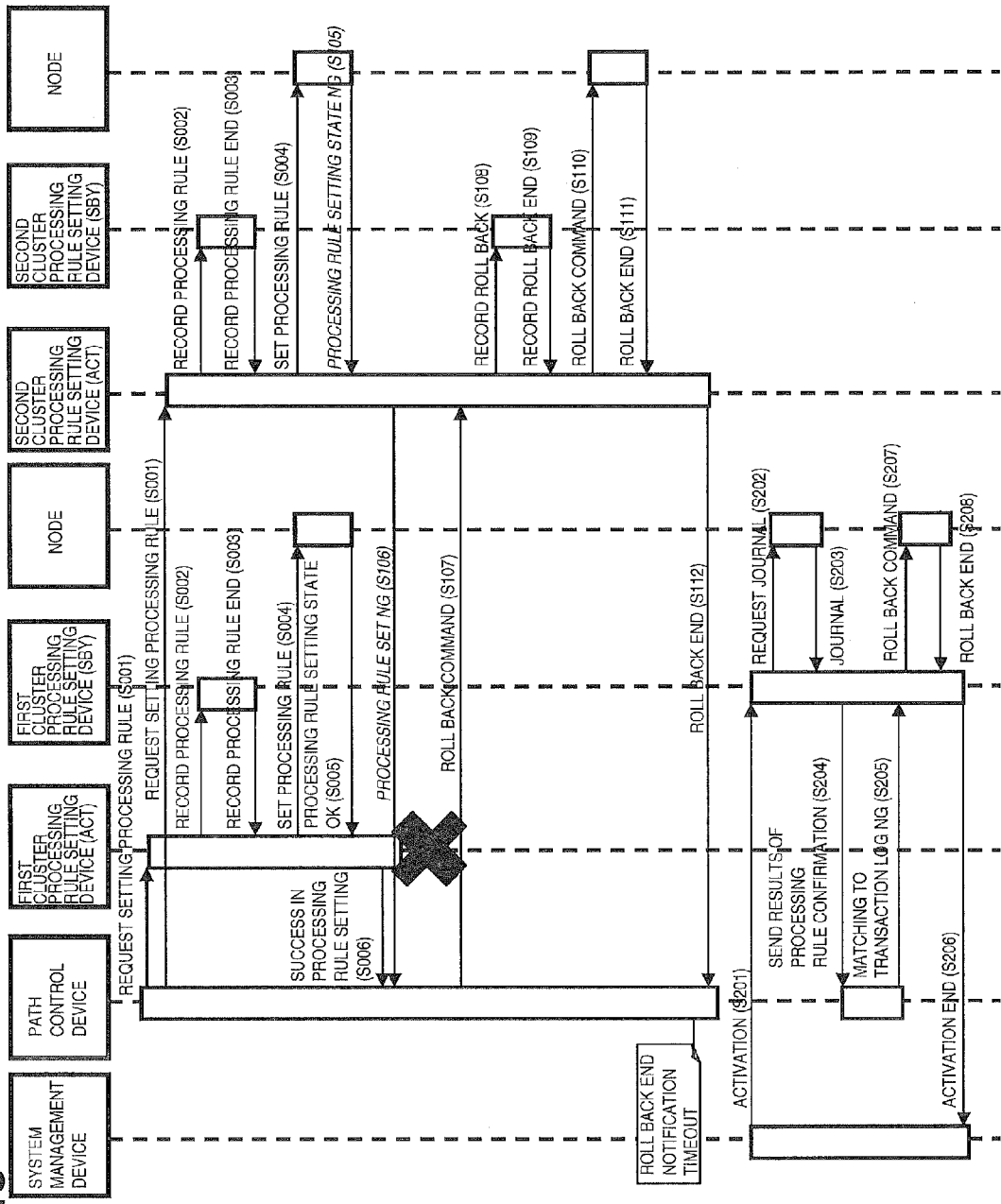
FIG. 26 is a sequence diagram for illustrating the operation (failure state of the node update and failure state of the processing rule setting device before sending a rollback command) of the exemplary embodiment 3.

FIG. 26 depicts a sequence diagram showing the operation in case there is a failure in the processing state setting state from the node 10, such that, before sending the rollback command, the processing rule setting device 20a has failed. In this case, switching of the processing rule setting devices by the system management device 40 and acquisition/matching of the journal data are carried out in the same way as in FIGS. 22 and 25. However, since rollback has already been commanded to the processing rule setting device 20c, the path control device 30 commands the rollback to the activated processing rule setting device 20b as well.

Figure 27:
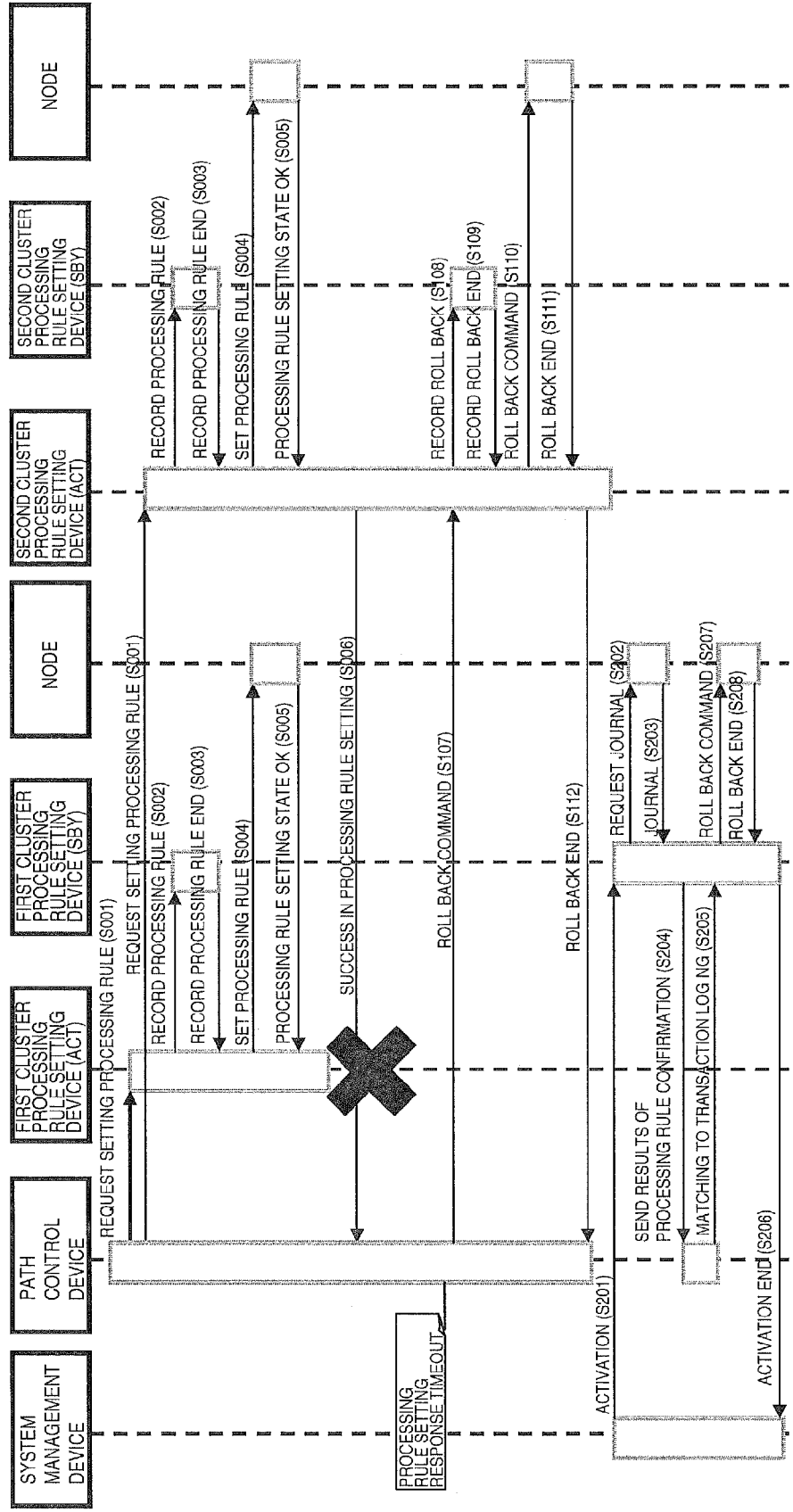
FIG. 27 is a sequence diagram for illustrating the operation (failure state of the processing rule setting device before receipt of a response of setting the processing rule) of the exemplary embodiment 3.

FIG. 27 depicts a sequence diagram showing the operation in case the processing rule has regularly been set but no notification concerning the success in processing rule setting has been sent from the processing rule setting device 20a. The overall operation is the same as that of FIGS. 22, 25 and hence the corresponding explanation is dispensed with.

Figure 28:
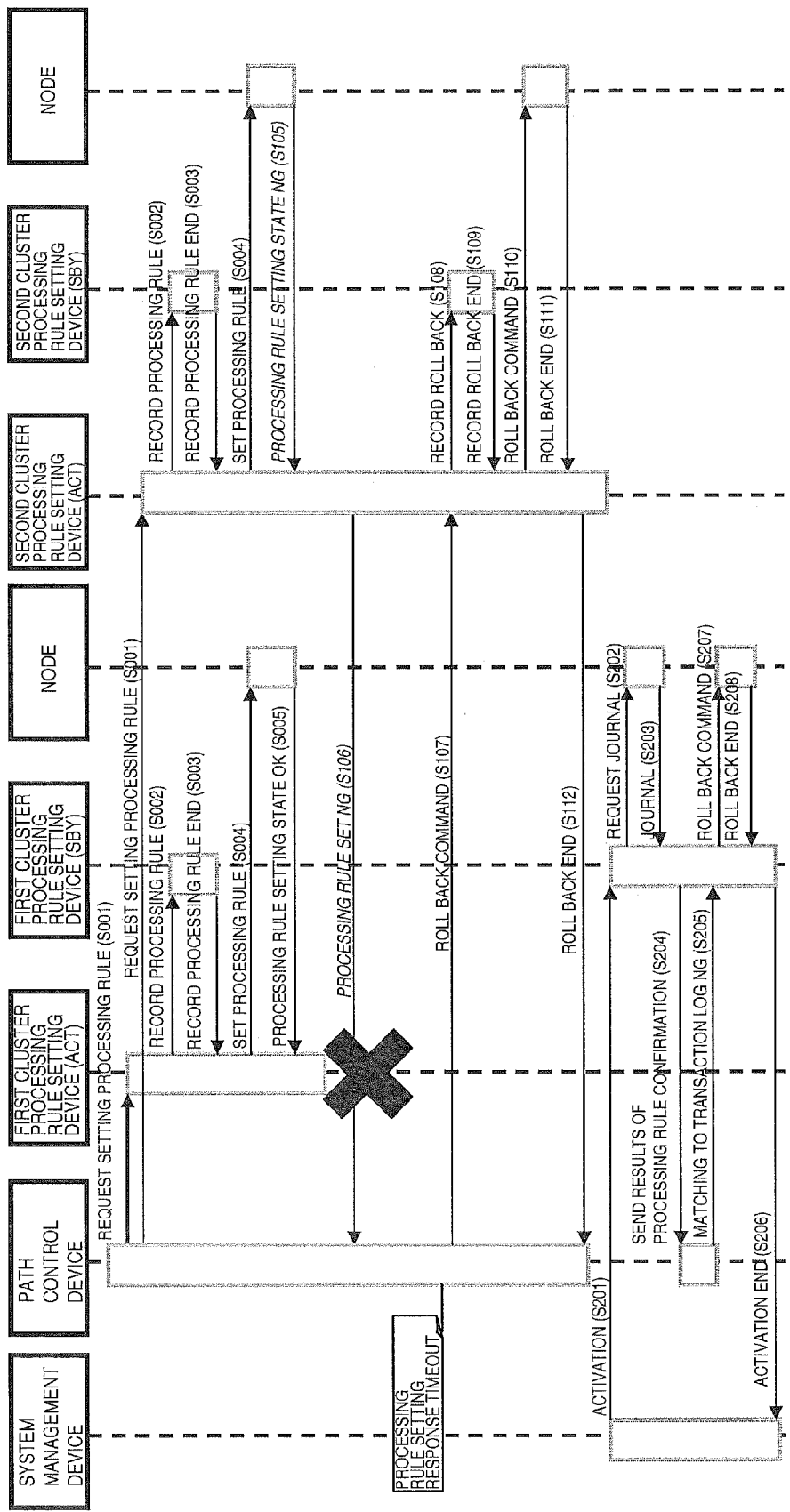
FIG. 28 is a sequence diagram for illustrating the operation (failure state of the node update and failure state of the processing rule setting device before receipt of the processing rule setting response) of the exemplary embodiment 3.

FIG. 28 depicts a sequence diagram showing the operation in case there is a failure in the processing rule setting state from the node 10, such that, even though a response to such effect, viz., the processing rule setting state being NG, was received from the processing rule setting device 20c, no response was received from the other processing rule setting device 20a. In this case, the switchings of the processing rule setting devices by the system management device 40 and the acquisition/matching of the journal data are carried out in the same way as in FIG. 26. However, since rollback has already been commanded to the processing rule setting device 20c, the path control device 30 commands rollback to the activated processing rule setting device 20b as well.

Figure 29:
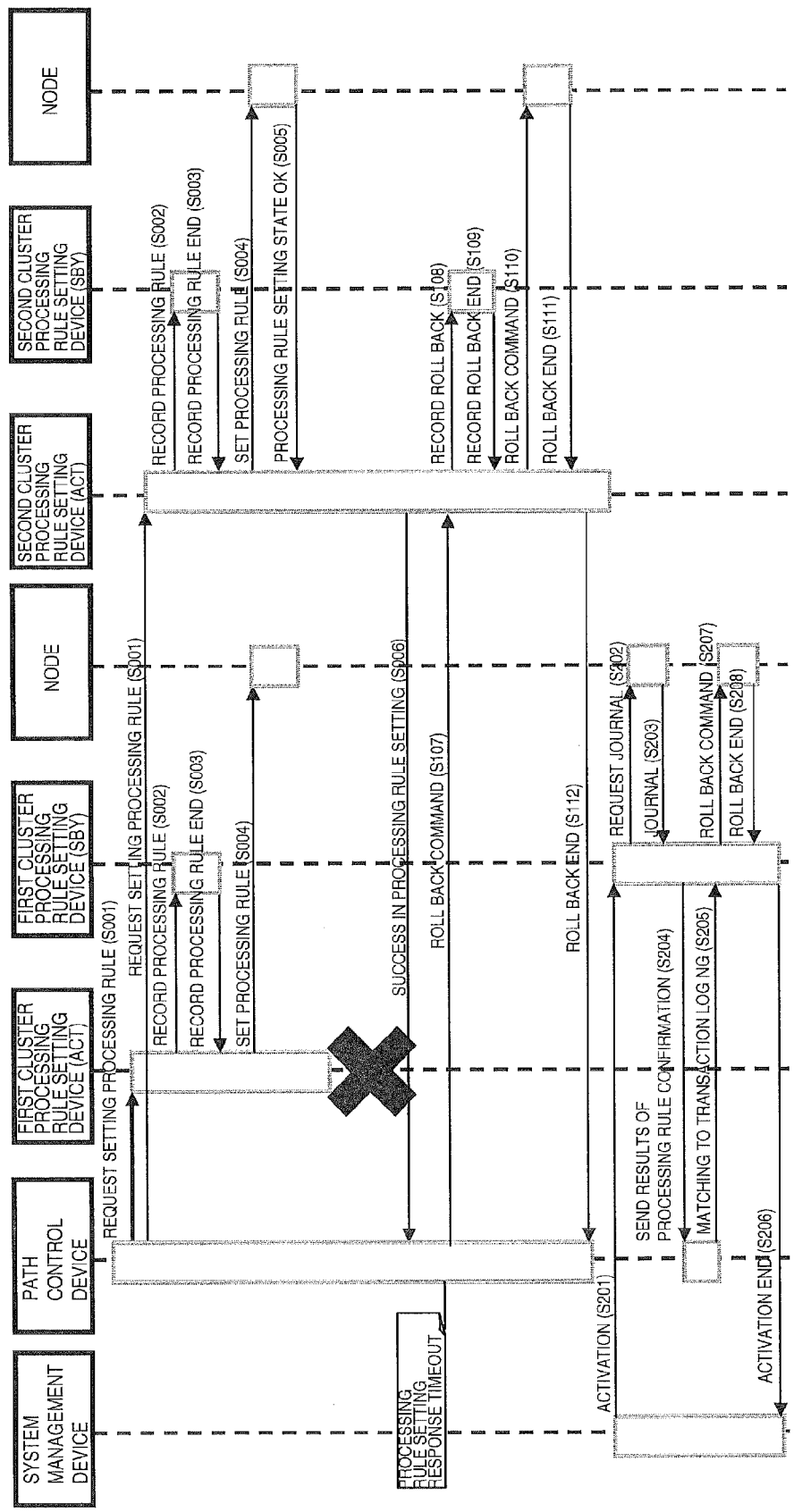
FIG. 29 is a sequence diagram for illustrating the operation (failure state of the processing rule setting device before receipt of the processing rule setting response) of the exemplary embodiment 3.

FIG. 29 depicts a sequence diagram showing the operation in case the processing rule was set as regularly, but the processing rule setting device 20a was unable to receive the processing rule setting state. In this case, the overall operation is the same as that of FIG. 27, and hence the corresponding explanation is dispensed with.

Figure 30:
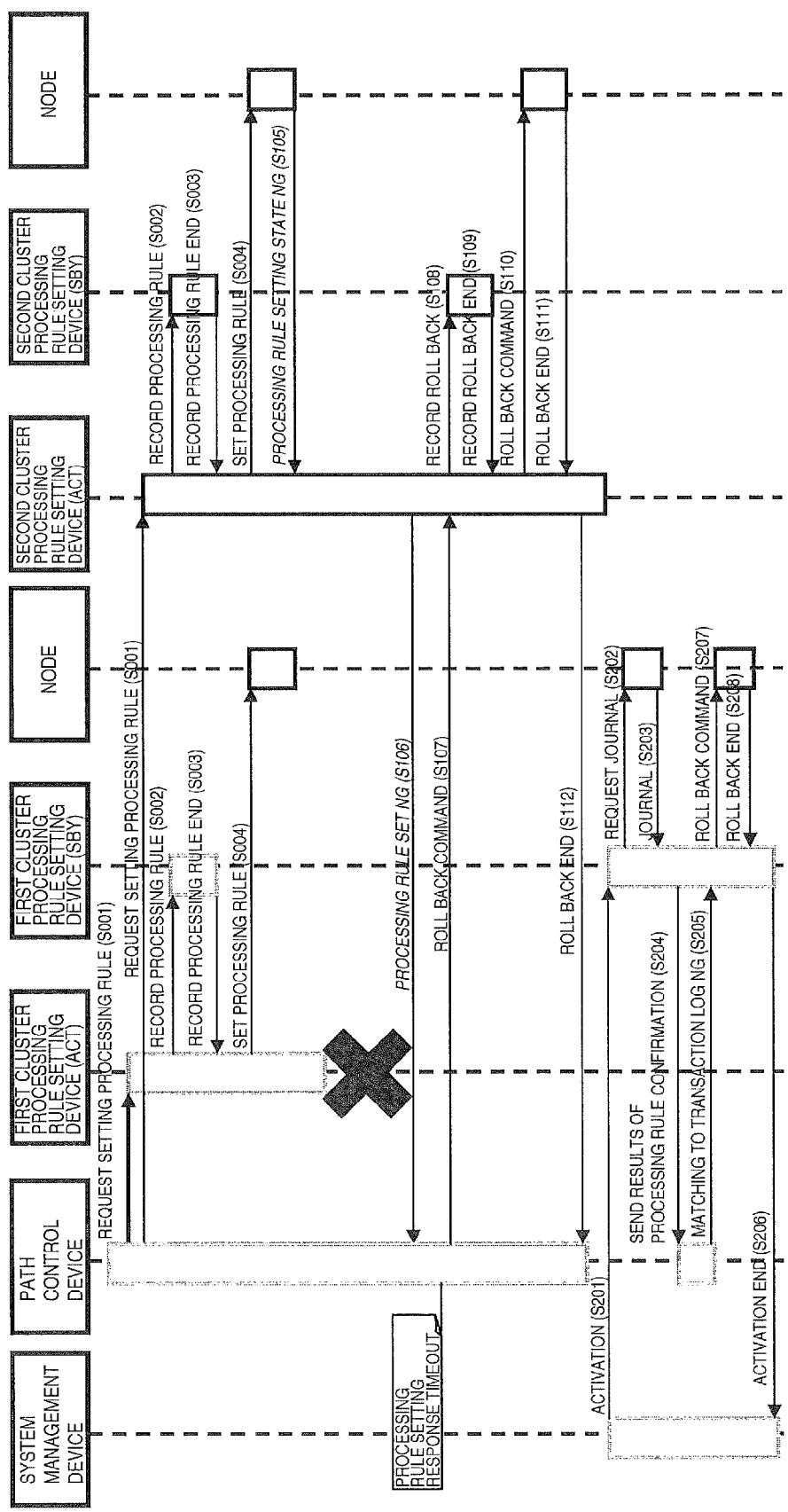
FIG. 30 is a sequence diagram for illustrating the operation (failure state of the node update and failure state of the processing rule setting device before receipt of the result of the processing rule setting) of the exemplary embodiment 3.

FIG. 30 depicts a sequence diagram showing the operation in case there is a failure in the processing rule setting state from the node 10, such that, even though a response to such effect, viz., the processing rule setting state being NG, was received from the processing rule setting device 20c, but the other processing rule setting device 20a was unable to receive the processing rule setting state so that no response was received therefrom. In this case, the switchings of the processing rule setting devices by the system management device 40 and the acquisition/matching of the journal data are carried out in the same way as in FIG. 28. However, since rollback has already been commanded to the processing rule setting device 20c, the path control device 30 commands rollback to the activated processing rule setting device 20b as well.

Figure 31:
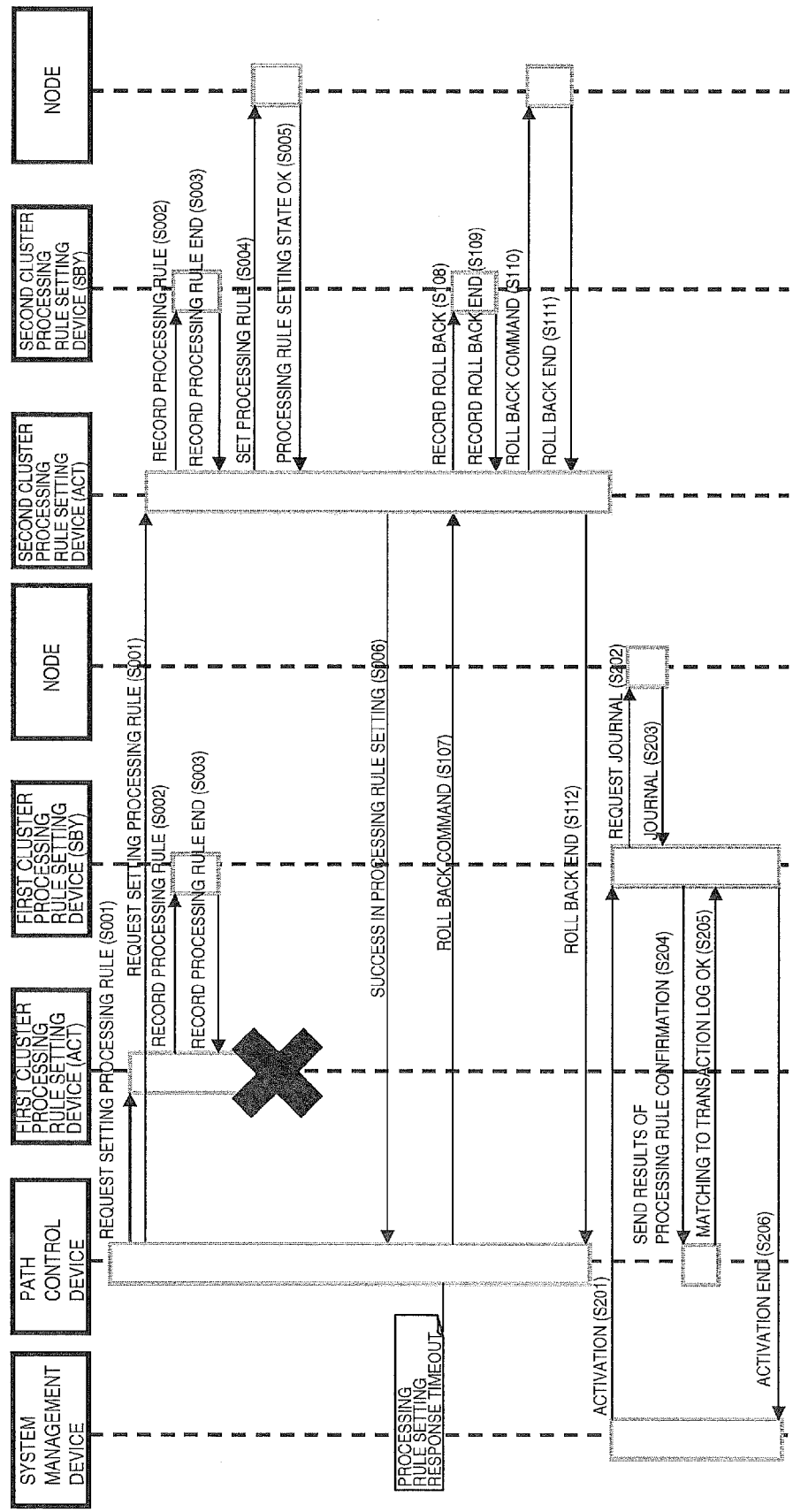
FIG. 31 is a sequence diagram for illustrating the operation (failure state of the processing rule setting device before setting the processing rule) of the exemplary embodiment 3.

FIG. 31 depicts a sequence diagram showing the operation in case a response that the processing rule was set as regularly (processing rule setting state OK) was received from the processing rule setting device 20c, but the other processing rule setting device 20a failed before setting the processing rule and returned no response. In this case, the path control device 30 commands rollback to the processing rule setting device 20c in the same way as in FIG. 29. The switching of the processing rule setting devices by the system management device 40 and the acquisition/matching of the journal data are also carried out. However, as a result, it becomes clear that the processing rule setting states of the nodes of the first cluster are already in the rollback state. Hence, a notification concerning the end of the activation is sent straightforwardly.

Figure 32:
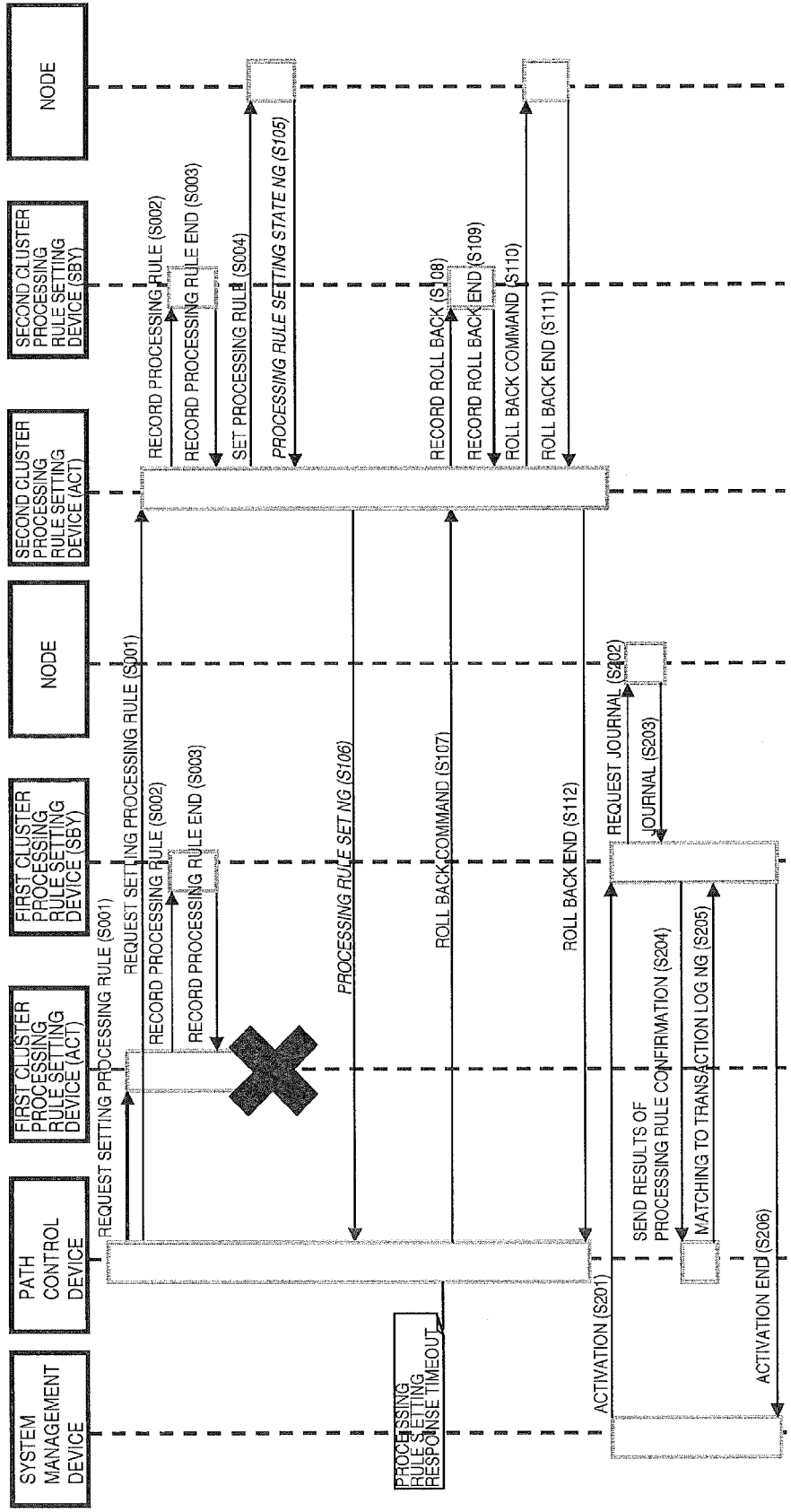
FIG. 32 is a sequence diagram for illustrating the operation (failure state of node update and the failure state of the processing rule setting device before setting the processing rule) of the exemplary embodiment 3.

FIG. 32 depicts a sequence diagram showing the operation in case there is a failure in the processing rule setting state from the node 10, such that, even though a response to such effect, viz., the processing rule setting state being NG, was received from the processing rule setting device 20c, the other processing rule setting device 20a failed before setting the processing rule and returned no response. In this case, the path control device 30 commands rollback to the processing rule setting device 20c in the same way as in FIG. 31. The switchings of the processing rule setting devices by the system management device 40 and the acquisition/matching of the journal data are carried out, however, as a result, it becomes clear that the processing rule setting states of the nodes of the first cluster are already in the rollback state. Hence, a notification concerning the end of the activation is sent straightforwardly.

Figure 33:
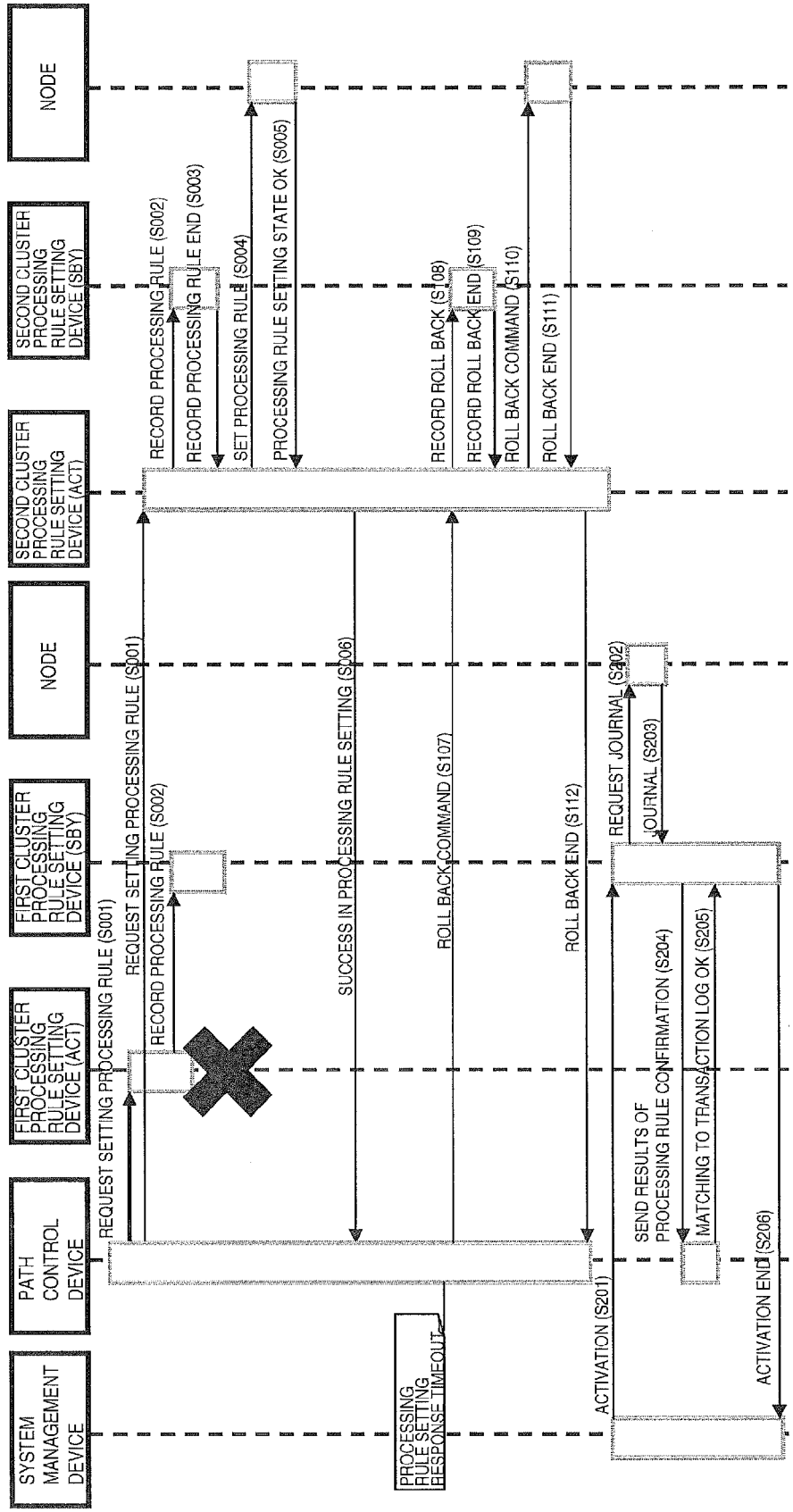
FIG. 33 is a sequence diagram for illustrating the operation (failure state of the processing rule setting device before receipt of the notification of the end of processing rule recording) of the exemplary embodiment 3.

FIG. 33 depicts a sequence diagram showing the operation in case a response that the processing rule was set as regularly (processing rule setting state OK) was received from the processing rule setting device 20c, but the other processing rule setting device 20a failed before setting the processing rule and returned no response. In such case, the path control device 30 commands rollback to the processing rule setting device 20c in the same way as in FIG. 29. The switching of the processing rule setting devices by the system management device 40 and the acquisition/matching of the journal data are carried out, however, as a result, it becomes clear that the processing rule setting states of the nodes of the first cluster are already in the rollback state. Hence, a notification concerning the end of the activation is sent straightforwardly.

Figure 34:
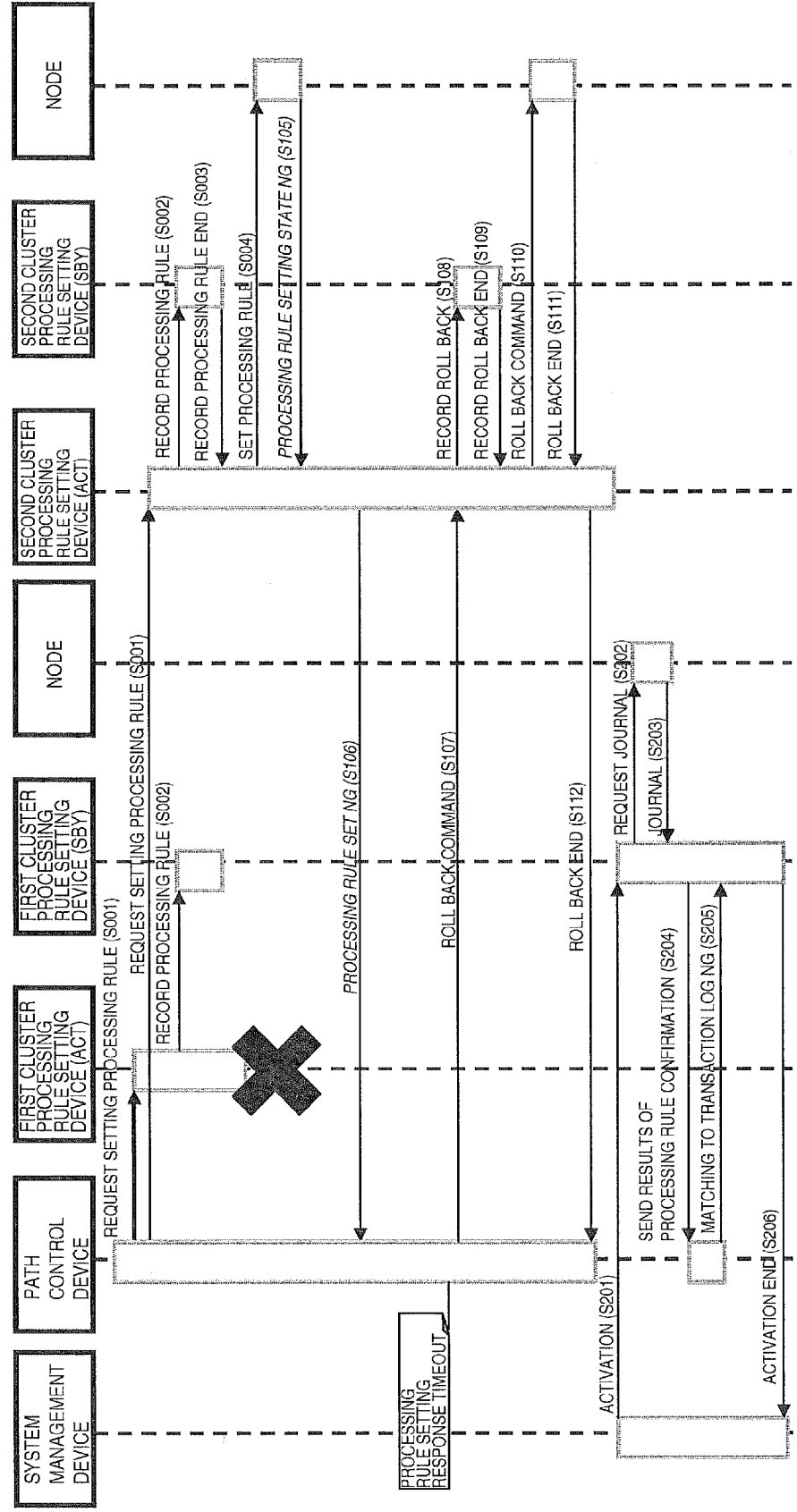
FIG. 34 is a sequence diagram for illustrating the operation (failure state of node update and failure state of the processing rule setting device before receipt of the notification of the end of processing rule recording) of the exemplary embodiment 3.

FIG. 34 depicts a sequence diagram showing the operation in case there is a failure in the processing rule setting state from the node 10, such that, even though a response to such effect, viz., the processing rule setting state being NG, was received from the processing rule setting device 20c, the other processing rule setting device 20a failed before receiving a notification concerning the recording end of the processing rule and returned no response. In this case, the path control device 30 commands rollback to the processing rule setting device 20c in the same way as in FIG. 33. The switchings of the processing rule setting devices by the system management device 40 and the acquisition/matching of the journal data are carried out, however, as a result, it becomes clear that the processing rule setting states of the nodes of the first cluster are already in the rollback state. Hence, a notification concerning the end of the activation is sent straightforwardly.

Figure 35:
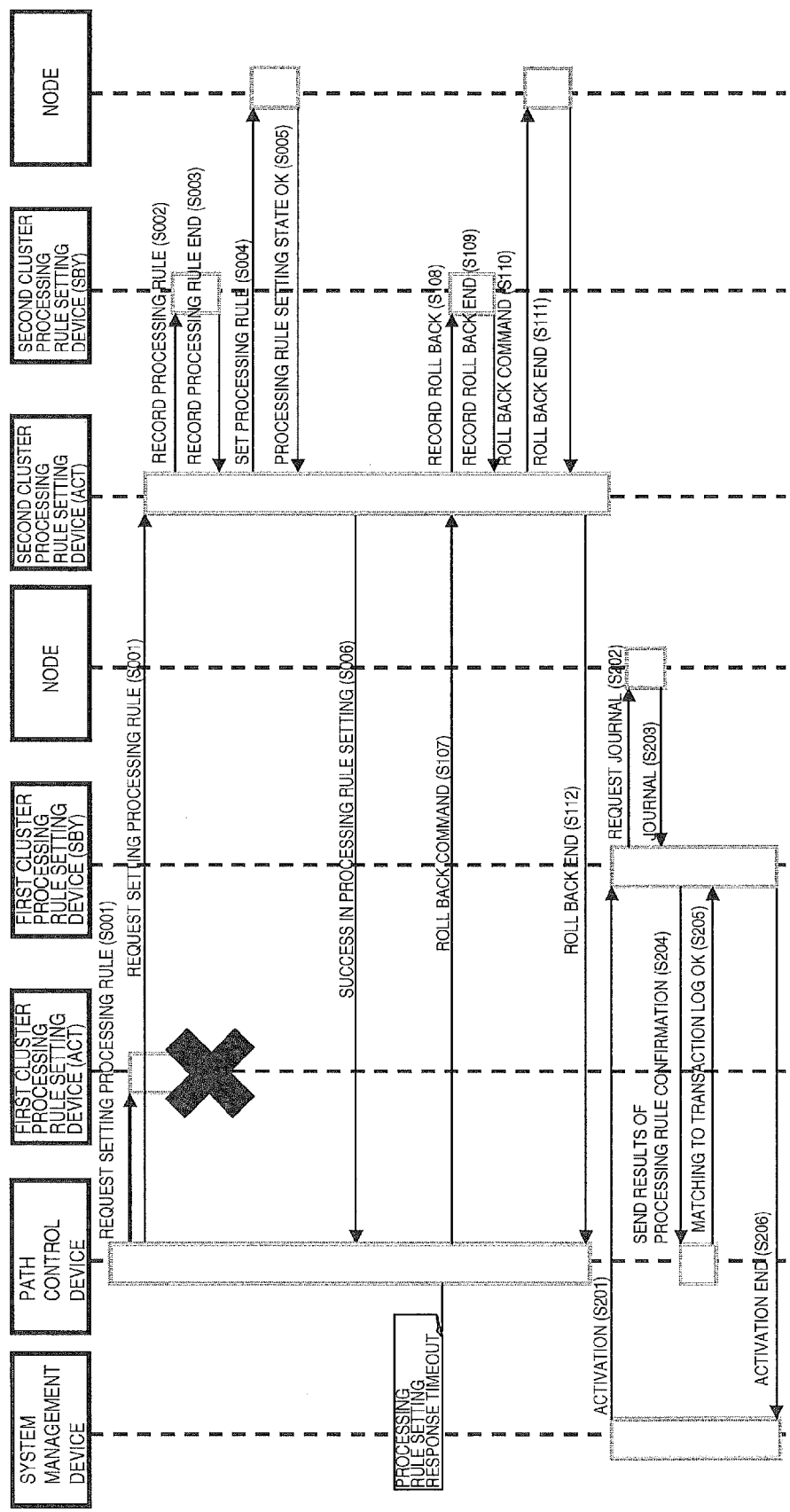
FIG. 35 is a sequence diagram for illustrating the operation (failure state of the processing rule setting device before a request of processing rule recording) of the exemplary embodiment 3.

FIG. 35 depicts a sequence diagram showing the operation in case a response that the processing rule was set as regularly (processing rule setting state OK) was received from the processing rule setting device 20c, but the other processing rule setting device 20a failed before recording the processing rule and returned no response. In such case, the path control device 30 commands rollback to the processing rule setting device 20c in the same way as in FIG. 29. The switching of the processing rule setting devices by the system management device 40 and the acquisition/matching of the journal data are carried out, however, as a result, it becomes clear that the processing rule setting states of the nodes of the first cluster are already in the rollback state. Hence, a notification concerning the end of the activation is sent straightforwardly.

Figure 36:
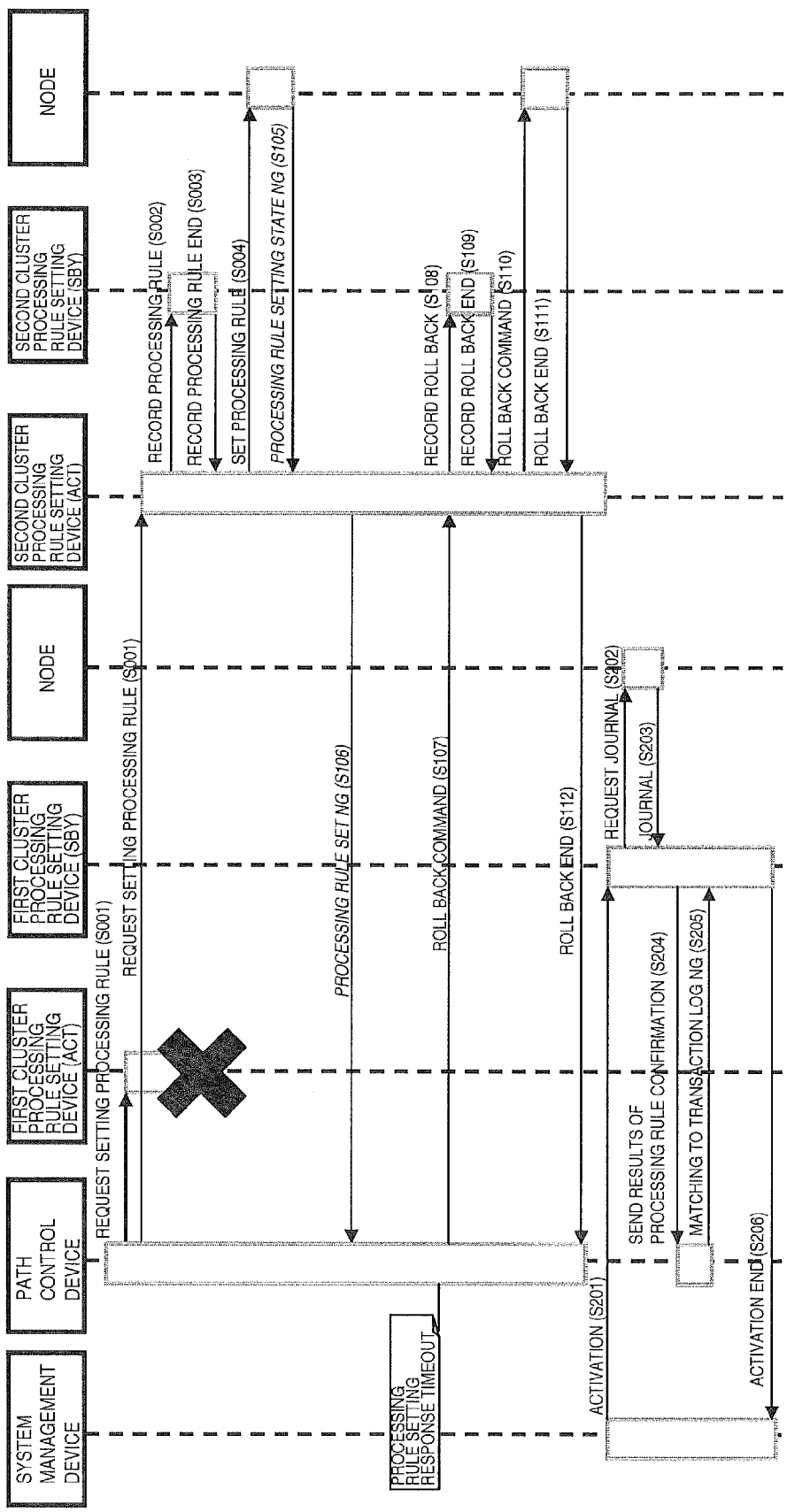
FIG. 36 is a sequence diagram for illustrating the operation (failure state of node update and the failure state of the processing rule setting device before the request of processing rule recording) of the exemplary embodiment 3.

FIG. 36 depicts a sequence diagram showing the operation in case there is a failure in the processing rule setting state from the node 10, such that, even though a response to such effect, viz., the processing rule setting state being NG, was received from the processing rule setting device 20c, the other processing rule setting device 20a failed before recording the processing rule and returned no response. In this case, the path control device 30 commands rollback to the processing rule setting device 20c in the same way as in FIG. 33. The switchings of the processing rule setting devices by the system management device 40 and the acquisition/matching of the journal data are carried out, however, as a result, it becomes clear that the processing rule setting states of the nodes of the first cluster are already in the rollback state. Hence, a notification concerning the end of the activation is sent straightforwardly.

It is seen from above that, no matter at which timing a processing rule setting device should have failed, the so failed device is changed over to another processing rule setting device of the standby system. Then, by performing matching to the node's journal data, it is determined whether or not rollback is necessary. Hence, a consistent processing rule setting state may be maintained.

Figure 37:
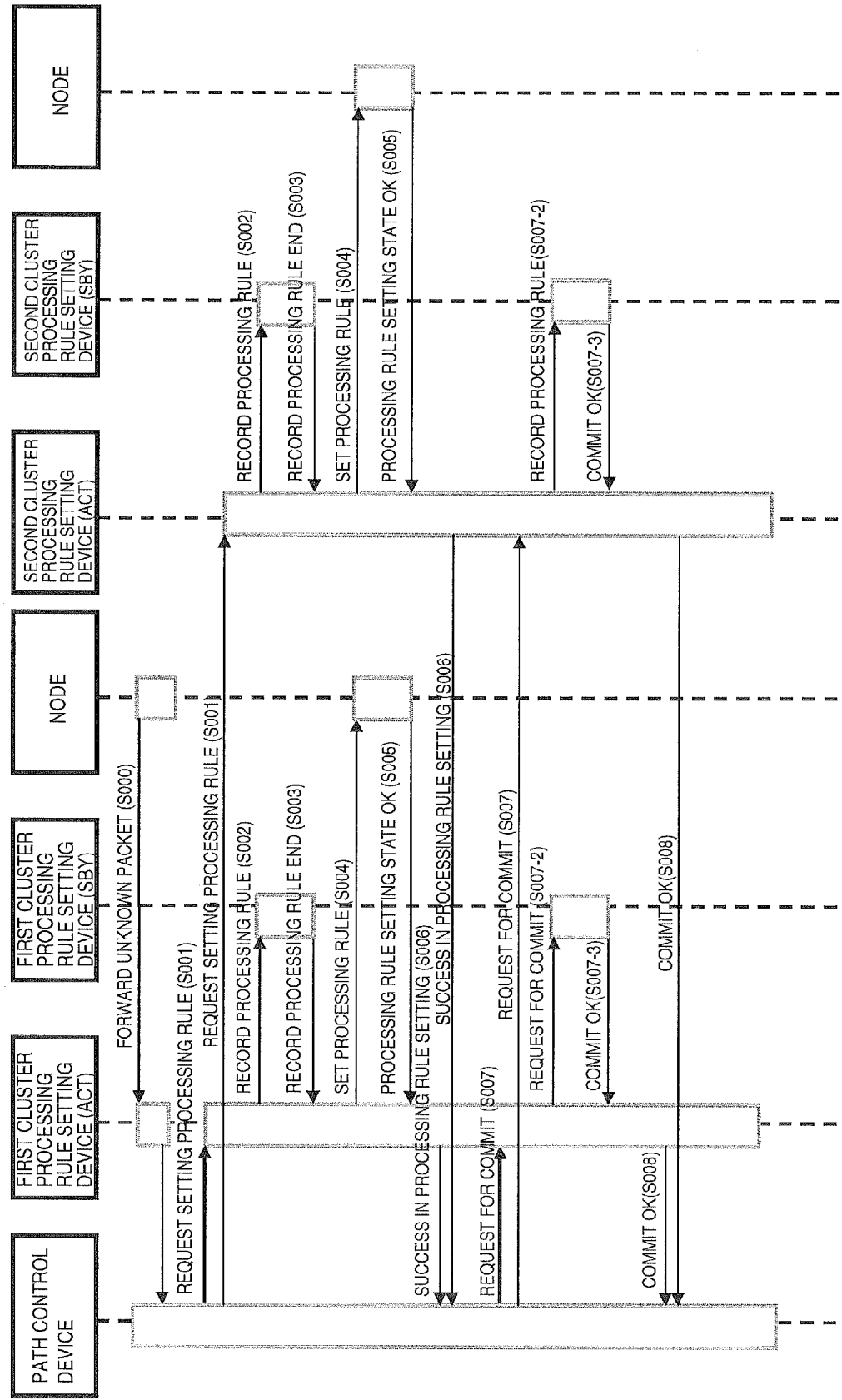
FIG. 37 is a sequence diagram for illustrating the operation (regular update) of an exemplary embodiment 4 of the present disclosure.

Although the description has been made of preferred exemplary embodiments of the present invention, these are given only by way of illustration and are not intended to limit the scope of the invention. That is, further modifications, substitutions or adjustments may be made without departing from the basic technical concept of the present invention. For example, it has been explained in the exemplary embodiment 3 that a commit is executed on the processing rule setting device operating in the active system. It is however also possible to execute a commit also on the processing rule setting device waiting in the standby system (exemplary embodiment 4), as shown in FIG. 37.

The configuration of the exemplary embodiments, described above, includes a single path control device, two clusters and two processing rule setting devices for each of the two clusters. Such configuration is only for simplifying the illustration of the exemplary embodiments of the invention. It is of course possible to change the number of the path control devices or the processing rule setting devices as desired depending on design parameters required of the communication system according to the present disclosure. The disclosures of the aforementioned Non Patent Literatures are incorporated herein by reference thereto. The particular exemplary embodiments or examples may be modified or adjusted within the gamut of the entire disclosure of the present invention, inclusive of claims, based on the fundamental technical concept of the invention. Further, a variety of combinations or selection of elements disclosed herein may be made within the scope of the claims.

Preferred forms of the present disclosure will now be summarized as follows.
(Mode 1)
(See Communication System According to the Above Mentioned First Aspect)
(Mode 2)
The communication system according to mode 1, wherein, the control device concludes whether or not an individual processing rule is set and whether or not the processing rules correlated with one another are set based on whether or not a flow identifier accorded to the processing rule set in the node be included in a response from the node; on whether or not a transaction identifier accorded common to the correlated processing rules be included in a response from the node.
(Mode 3)
The communication system according to mode 1 or 2, wherein, the control device is preset in a redundant (multiple) fashion; the processing rule(s) as set is stored for backup in the redundant control device waiting in a standby system.
(Mode 4)
The communication system according to mode 3, wherein, when changed over to an active state, the redundant control device, waiting in the standby system, continues setting the processing rule(s) in the node, or executes a rollback operation, based on a setting state(s) of the processing rule(s) received from the node and the processing rule(s) stored for backup.
(Mode 5)
The communication system according to any one of modes 1 to 4, wherein, the control device includes a path control device that, in response to a request for setting a processing rule from any (arbitrary) one of the nodes, calculates a packet forwarding path to prepare a processing rule(s) that implements the packet forwarding path; and a plurality of processing rules setting devices each of which sets the processing rule(s) for the node(s) on the packet forwarding path belonging to a cluster the processing rule setting device in question belongs to.
(Mode 6)
The communication system according to mode 5, wherein, the node holds, in a manner correlated with one another, a pre-update processing rule(s) for the node and a transaction identifier accorded common to the processing rules correlated with one another and to the pre-update processing rule(s) for the node;
the processing rule setting device receiving, in case of detection of a failure in the processing rule as set in at least one node, an as-set processing(s) rule from the processing rule setting device belonging to another cluster to carry out rollback based on a transaction identifier included in the as-set processing rule(s).
(Mode 7)
The communication system according to mode 5 or 6, wherein,
in case the path control device succeeded in setting the processing rules, correlated with one another, the path control device requests a commit to each processing rule setting device; the path control device carrying out a rollback operation in case commit responses from the processing rule setting devices are not in harmony.
(Mode 8)
(See the Control Device According to the Second Aspect)
(Mode 9)
The control device according to mode 8, wherein, the control device concludes whether or not an individual processing rule is set and whether or not the processing rules correlated with one another are set based on whether or not a flow identifier accorded to the processing rule set in the node be included in a response from the node; and on whether or not a transaction identifier accorded common to the correlated processing rules be included in a response from the node.
(Mode 10)
The control device according to mode 8 or 9, wherein, the control device is connected to a redundant control device waiting as a standby system, the redundant control device storing the as-set processing rule for backup.
(Mode 11)
The control device according to mode 10, wherein, when changed over to an active state, the redundant, waiting as the standby system, continues setting the processing rule(s) in the node, or executes a rollback operation, based on a setting state(s) of the processing rule(s) received from the node and the processing rule(s) stored for backup.

(Mode 12)

The control device according to any one of modes 8 to 11, wherein, the control device includes a path control device that, in response to a request for setting a processing rule(s) from any (arbitrary) one of the nodes, calculates a packet forwarding path to prepare a processing rule(s) that implements the packet forwarding path; and a plurality of processing rule(s) setting devices each of which sets the processing rule(s) for the node(s) on the packet forwarding path belonging to a cluster the processing rule setting device in question belongs to.

(Mode 13)

The control device according to mode 12, wherein, the node holds, in a manner correlated with one another, a pre-update processing rule(s) for the node and a transaction identifier accorded common to the processing rules correlated with one another and to the pre-update processing rule(s) for the node; the processing rule(s) setting device receiving, in case of detection of a failure in the processing rule(s) as set in at least one node, an as-set processing rule from the processing rule setting device belonging to another cluster, to carry out rollback based on the transaction identifier included in the as-set processing rule(s).

(Mode 14)

The control device according to mode 12 or 13, wherein, in case the control device succeeded in setting the processing rules, correlated with one another, the control device requests a commit to each processing rule setting device; the path control device carrying out a rollback operation in case commit responses from the processing rule setting devices are not in harmony.

(Mode 15)

(See the Node According to the Above Mentioned Third Aspect)

(Mode 16)

The node according to mode 15, wherein, the node further holds, in a manner correlated with one another, a pre-update processing rule for the node and a transaction identifier accorded common to the processing rules correlated with one another and to the pre-update processing rule(s) for the node; the node carrying out a rollback operation based on the transaction identifier.

(Mode 17)

(See the Method for Setting a Processing Rule According to the Above Mentioned Fourth Aspect)

(Mode 18)

(See the Program for the Control Device According to the Above Mentioned Fifth Aspect)

(Mode 19)

(See the Program for the Node According to the Above Mentioned Fifth Aspect)

What is claimed is:

1. A communication system including:
a plurality of nodes each including a packet processor that processes a packet in accordance with a packet handling operation(s) when said packet is received; said packet handling operation(s) correlating a processing to be applied to said packet with a matching rule that identifies the packet to which the processing is to be applied; and
a control device that calculates a packet forwarding path in response to a request to set the packet handling operation from any one of the nodes; said control device setting a plurality of said packet handling operations that implement said packet forwarding path for the node(s) on said packet forwarding path and recording said packet handling operations in correlation with one another;
said control device inquiring at said node(s) on said packet forwarding path about a setting state(s) of said packet handling operation(s); said control device carrying out, in case a failure is detected in the packet handling operation(s) set in at least one of the nodes on said packet forwarding path, a rollback operation of the correlated packet handling operations set in other node(s) on said packet forwarding path, wherein;
said control device is provided in a redundant (multiple) fashion; the packet handling operation(s) as set is stored for backup in the redundant control device, that is waiting as a standby system; and upon changing over to an active state, said redundant control device waiting as the standby system continues setting the packet handling operation(s) in said node, or executes a rollback operation, based on a setting state(s) of the packet handling operation(s) stored for backup and the packet handling operation(s) received from said node.

2. The communication system according to claim 1, wherein,
said control device concludes whether or not an individual packet handling operation is set and whether or not said packet handling operations correlated with one another are set, based on whether or not a flow identifier accorded to the packet handling operation set in said node be included in a response from said node; and whether or not a transaction identifier accorded common to said correlated packet handling operations be included in a response from said node.

3. The communication system according to claim 2, wherein,
said control device is provided in a redundant (multiple) fashion;
the packet handling operation(s) as set is stored for backup in the redundant control device, that is waiting as a standby system.

4. The communication system according to claim 1, wherein,
said control device includes
a path control device that, in response to a request for setting a packet handling operation from any one of said nodes, calculates a packet forwarding path to prepare a packet handling operation(s) that implements said packet forwarding path; and
a plurality of packet handling operation setting devices each of which sets the packet handling operation(s) for the node(s) on said packet forwarding path belonging to a cluster the packet handling operation setting device in question belongs to.

5. The communication system according to claim 4, wherein,
said node holds, in a manner correlated with one another, a pre-update packet handling operation(s) for said node and a transaction identifier accorded common to the packet handling operations correlated with one another and to said pre-update packet handling operation(s) for said node;
said packet handling operation setting device receiving, in case of detection of a failure in the packet handling operation as set in at least one node, an as-set packet handling operation from the packet handling operation setting device belonging to another cluster to command said node to carry out rollback based on a transaction identifier included in said as-set packet handling operation.

6. The communication system according to claim 5, wherein,
in case the path control device succeeded in setting the packet handling operations, correlated with one another, the path control device requests a commit to each packet handling operation setting device; said path control device carrying out a rollback operation in case commit responses from the packet handling operation setting devices are not in harmony.

7. The communication system according to claim 4, wherein,
in case the path control device succeeded in setting the packet handling operations, correlated with one another, the path control device requests a commit to each packet handling operation setting device; said path control device carrying out a rollback operation in case commit responses from the packet handling operation setting devices are not in harmony.

8. The communication system according to claim 1, wherein, said control device includes a path control device that, in response to a request for setting a packet handling operation from any one of said nodes, calculates a packet forwarding path to prepare a packet handling operation(s) that implements said packet forwarding path; and a plurality of packet handling operation setting devices each of which sets the packet handling operation(s) for the node(s) on said packet forwarding path belonging to a cluster the packet handling operation setting device in question belongs to.

9. The communication system according to claim 1, wherein, said control device includes a path control device that, in response to a request for setting a packet handling operation from any one of said nodes, calculates a packet forwarding path to prepare a packet handling operation(s) that implements said packet forwarding path; and
a plurality of packet handling operation setting devices each of which sets the packet handling operation(s) for the node(s) on said packet forwarding path belonging to a cluster the packet handling operation setting device in question belongs to.

10. The communication system according to claim 1, wherein the rollback operation is between physically separated network devices.

11. A control device connected to a plurality of nodes each having a packet processor that processes a packet in accordance with a packet handling operation(s) when said packet is received; said packet handling operation(s) correlating the processing to be applied to said packet with a matching rule that identifies the packet to which the processing is to be applied, said control device comprising;
a first unit calculating a packet forwarding path in response to a request for setting a packet handling operation(s) from any one of said nodes; said control device setting the packet handling operations that implement said packet forwarding path and recording said packet handling operations in a state correlated with one another;
a second unit inquiring at the node(s) on said packet forwarding path about the packet handling operation setting states; and
a third unit executing a rollback operation of the correlated packet handling operations set in other node(s), when failure is detected in the packet handling operation(s) set in at least one of said nodes wherein; said control device is connected to a redundant control device waiting as a standby system, said redundant control device storing as-set packet handling operation(s) for backup; and
upon changing over to an active state, the redundant control device, waiting as the standby system, continues setting the packet handling operation(s) in said node, or executes a rollback operation, based on a setting state(s) of the packet handling operations) received from said node and processing rule(s) stored for backup.

12. The control device according to claim 11, wherein,
said control device concludes whether or not an individual packet handling operation is set and whether or not said packet handling operations correlated with one another are set based on whether or not a flow identifier accorded to the packet handling operation set in said node be included in a response from said node; and
on whether or not a transaction identifier accorded common to said correlated packet handling operations be included in a response from said node.

13. The control device according to claim 12, wherein,
said control device is connected to a redundant control device waiting as a standby system, said redundant control device storing the as-set packet handling operation (s) for backup.

14. The control device according to claim 11, wherein,
said control device includes
a path control device that, in response to a request for setting a packet handling operation(s) from any one of said nodes, calculates a packet forwarding path to prepare a packet handling operation(s) that implements said packet forwarding path; and
a plurality of packet handling operation setting devices each of which sets the packet handling operation(s) for the node(s) on said packet forwarding path belonging to a cluster the packet handling operation setting device in question belongs to.

15. The control device according to claim 14, wherein,
said node holds, in a manner correlated with one another, a pre-update packet handling operation(s) for said node and a transaction identifier accorded common to the packet handling operations correlated with one another and to said pre-update packet handling operation(s) for said node;
said packet handling operation setting device receiving, in case of detection of a failure in the packet handling operation(s) as set in at least one node, an as-set packet handling operation from the packet handling operation setting device belonging to another cluster, to command said node to carry out rollback based on the transaction identifier included in said as-set packet handling operation(s).

16. The control device according to claim 14, wherein,
in case the control device succeeded in setting the packet handling operations, correlated with one another, the control device requests a commit to each packet handling operation setting device; said path control device carrying out a rollback operation in case commit responses from the packet handling operation setting devices are not in harmony.

17. A method for setting a packet handling operation (s), comprising
providing a control device, connected to a plurality of nodes each having a packet processor that processes a packet in accordance with a packet handling operation(s) when said packet is received, said packet handling operation correlating a processing to be applied to said packet with a matching rule that identifies the packet to which the processing is to be applied;

calculating a packet forwarding path in response to a request for setting packet handling operation(s) from said node, sets packet handling operation(s) that implements said packet forwarding path on the node(s) on said packet forwarding path, and records said packet handling operation(s) in a manner coordinated with one another;

inquiring by said control device at the node(s) on said packet forwarding path about a state of setting of said packet handling operations and, upon detecting a failure in the packet handling operations set in at least one node, executing a rollback operation on the correlated packet handling operation(s) set in other node(s), wherein;

said control device is provided in a redundant (multiple) fashion; the packet handling operation(s) as set is stored for backup in the redundant control device, that is waiting as a standby system; and upon changing over to an active state, said redundant control device waiting as the standby system continues setting the packet handling operation(s) in said node, or executes a rollback operation, based on a setting state(s) of the packet handling operation(s) stored for backup and the packet handling operation(s) received from said node.

* * * * *